(12) United States Patent
Wyville et al.

(10) Patent No.: US 8,855,175 B2
(45) Date of Patent: Oct. 7, 2014

(54) LOW COMPLEXITY ALL-DIGITAL PIM COMPENSATOR

(71) Applicant: Telefonaktiebolaget L M Ericsson (publ), Stockholm (SE)

(72) Inventors: Mark Wyville, Ottawa, CA (US); Lars Johan Thorebäck, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 30 days.

(21) Appl. No.: 13/732,610

(22) Filed: Jan. 2, 2013

(65) Prior Publication Data

US 2014/0036969 A1 Feb. 6, 2014

Related U.S. Application Data

(63) Continuation-in-part of application No. 13/565,167, filed on Aug. 2, 2012.

(51) Int. Cl.
| | | |
|---|---|---|
| *H04B 1/38* | (2006.01) | |
| *H04B 1/10* | (2006.01) | |
| *H04B 1/12* | (2006.01) | |
| *H04B 1/52* | (2006.01) | |

(52) U.S. Cl.
CPC .................. *H04B 1/38* (2013.01); *H04B 1/109* (2013.01); *H04B 1/123* (2013.01); *H04B 1/525* (2013.01)
USPC ........... 375/219; 375/295; 375/316; 375/296; 375/297; 375/220; 375/221; 375/224; 375/227; 375/285; 375/346

(58) Field of Classification Search
CPC ...... H04B 13/46; H04B 1/123; H04B 1/0475; H04B 1/10; H04B 1/1027; H04B 1/1036; H04B 1/7107; H04B 1/71072; H04B 1/71075; H04B 1/711; H04B 1/715; H04B 1/38; H04B 3/28; H04B 3/30; H04B 7/15564; H04B 7/15585; H04B 15/00; H04B 15/02; H04B 15/025; H04B 15/04; H04B 2001/10; H04B 2001/1027; H04B 2001/7097; H04B 2001/7103; H04B 2001/7107; H04B 2001/71077; H04B 2001/715; H04B 2001/7152; H04B 2001/7154; H04B 1/62; H04B 1/525; H04B 2001/0425; H04B 2001/0441; H04B 10/58; H04B 10/2507; H04B 10/697; H03F 1/3258; H03F 1/3294; H03F 1/3241; H03F 1/3276; H03F 2201/3224; H03F 2201/3233; H04L 27/368; H04L 27/367; H04L 25/03343
USPC ......... 375/295, 316, 296, 297, 219, 220, 221, 375/224, 227, 285, 346

See application file for complete search history.

(56) References Cited

U.S. PATENT DOCUMENTS

| | | | |
|---|---|---|---|
| 5,473,460 | A | 12/1995 | Haner et al. |
| 5,875,391 | A | 2/1999 | Riley et al. |
| 6,041,223 | A | 3/2000 | Thomas |
| 7,505,530 | B2 | 3/2009 | Rexberg et al. |
| 7,634,198 | B2 | 12/2009 | Peral |
| 8,170,487 | B2 * | 5/2012 | Sahota et al. ................ 455/63.1 |
| 2002/0121936 | A1 | 9/2002 | Gharpurey et al. |
| 2003/0185164 | A1 | 10/2003 | Marko et al. |
| 2004/0048576 | A1 * | 3/2004 | Hildebrand et al. ......... 455/67.3 |
| 2004/0203458 | A1 * | 10/2004 | Nigra ........................ 455/67.13 |
| 2005/0134336 | A1 | 6/2005 | Goldblatt et al. |
| 2006/0181344 | A1 | 8/2006 | Ksienski et al. |
| 2008/0129421 | A1 | 6/2008 | Ninan et al. |
| 2009/0075612 | A1 | 3/2009 | Keehr et al. |
| 2009/0203347 | A1 | 8/2009 | Kaczman et al. |
| 2010/0093298 | A1 | 4/2010 | Pratt et al. |
| 2011/0075754 | A1 * | 3/2011 | Smith .......................... 375/285 |
| 2011/0149714 | A1 | 6/2011 | Rimini et al. |
| 2012/0140860 | A1 | 6/2012 | Rimini et al. |
| 2012/0288026 | A1 | 11/2012 | Wang |
| 2012/0295558 | A1 | 11/2012 | Wang et al. |
| 2014/0036736 | A1 * | 2/2014 | Wyville ....................... 370/278 |

FOREIGN PATENT DOCUMENTS

| DE | 102010033841 A1 | 2/2012 |
|---|---|---|
| WO | 2008048534 A1 | 4/2008 |
| WO | 2009082084 A1 | 7/2009 |

OTHER PUBLICATIONS

Amin et al., "Transmit and Receive Crosstalk Cancellation", 2010 6th International Conference on Emerging Technologies, Oct. 18-19, 2010, pp. 210-215.

Bassam et al., "2-D Digital Predistortion (2-D-DPD) Architecture for Concurrent Dual-Band Transmitters", IEEE Trans MTT, vol. 59, No. 10, Oct. 2011, p. 2547-2553.

Ghannouchi et al., "Behavioral Modeling and Predistortion", IEEE Microwave Magazine, Dec. 2009, pp. 52-64.

Henrie et al., "Prediction of Passive Intermodulation from Coaxial Connectors in Microwave Networks", IEEE Trans. on Microwave Theory and Techniques, vol. 56, No. 1, Jan. 2008, pp. 209-216.

Author Unknown, "Agilent EESof EDA Premier Communications Design Software Product Overview", Aug. 3, 2011, 5989-7568EN, www.agilent.com/find/eesof.

Author Unknown, "Digital Pre-Distortion to Linearize PA Hands-On Workshop", ESL Design: Training and Events Details, Retrieved Nov. 22, 2012, 2 pages, www.home.agilent.com/agilent/eventDetail.

Author Unknown, "W1716ET SystemVue Digital Pre-Distortion Builder", SystemVue Design Kits and Application Personalities: Product Details, Retrieved Nov. 22, 2012, 2 pages, www.home.agilent.com/en.

Non-Final Office Action for U.S. Appl. No. 13/565,167, mailed Aug. 14, 2013, 9 pages.

Non-Final Office Action for U.S. Appl. No. 13/565,167, mailed Dec. 18, 2013, 9 pages.

International Search Report and Written Opinion for PCT/IB2013/056036, mailed Feb. 7, 2014, 8 pages.

Li, Jian et al., "Adaptive Volterra Predistorters for Compensation of Non-linear Effects with Memory in OFDM Transmitters," Proceedings of the 4th Annual Communication Networks and Services Research Conference, May 24-25, 2006, Moncton, New Brunswick, Canada, 4 pages.

International Search Report and Written Opinion for PCT/IB2013/056155 mailed Feb. 19, 2014, 11 pages.

Notice of Allowance for U.S. Appl. No. 13/565,167, mailed Jul. 18, 2014, 6 pages.

\* cited by examiner

*Primary Examiner* — Siu Lee

(74) *Attorney, Agent, or Firm* — Withrow & Terranova, PLLC

(57) ABSTRACT

The present disclosure relates to compensation for Passive Intermodulation (PIM) distortion in a receiver. In one embodiment, a communication device includes a transmitter that is configured to receive a digital input signal and output a radio frequency transmit signal, a main receiver configured to receive a radio frequency receive signal and output a digital output signal, and a PIM compensation subsystem. The radio frequency receive signal includes PIM distortion that is a non-linear function of the radio frequency transmit signal output by the transmitter. In order to compensate for the PIM distortion, a PIM compensation subsystem receives the digital input signal of the transmitter, generates a digital PIM estimate signal that is an estimate of the PIM distortion in the digital output signal of the main receiver, and subtracts the digital PIM estimate signal from the digital output signal of the main receiver.

18 Claims, 14 Drawing Sheets

US 8,855,175 B2

LOW COMPLEXITY ALL-DIGITAL PIM COMPENSATOR

RELATED APPLICATIONS

This application is a Continuation-in-Part of U.S. application Ser. No. 13/565,167 entitled PIM COMPENSATION IN A RECEIVER, filed Aug. 2, 2012, the disclosure of which is hereby incorporated herein by reference in its entirety.

FIELD OF THE DISCLOSURE

The present disclosure relates to compensating for Passive Intermodulation (PIM) in a receiver.

BACKGROUND

Passive Intermodulation (PIM) occurs when signals are present in a passive device that exhibits some non-linear behavior. In a wireless communication device such as a base station of a wireless communication network, PIM occurs when a high power transmit signal is passed through a passive device that exhibits some non-linearity. This non-linear passive device is referred to as a PIM source. The PIM source may be a non-linear component in a transmit path of the wireless communication device such as, for example, a cable, a connector, a duplex filter, an antenna of the wireless communication device, or the like. The PIM source may alternatively be due to an object that is external to the wireless communication device (e.g., a fence). The wireless communication device may have multiple PIM sources.

The PIM created by a PIM source includes multiple Intermodulation Products (IMPs) (e.g., $2^{nd}$ order, $3^{rd}$ order, etc.) of the transmit signal. When any of the IMPs fall within a passband of a receiver of the wireless communication device, a resulting PIM distortion is introduced into the received signal and, as a result, the receiver is desensitized. PIM distortion is particularly problematic for multi-carrier or multi-band wireless communication devices. Multi-carrier or multi-band signals are an important characteristic of modern wireless communication standards (e.g., the Long Term Evolution (LTE) cellular communication standard) as well as multi-standard, or multi-band, wireless communication devices. As such, PIM distortion is becoming an increasingly important problem that needs to be addressed.

One previous approach to addressing PIM distortion is described in U.S. Patent Application Publication No. 2011/0075754, entitled "Mitigation of Transmitter Passive and Active Intermodulation Products in Real and Continuous Time in the Transmitter and Co-Located Receiver," which was filed on Aug. 5, 2010 and published on Mar. 31, 2011. In this published patent application, PIM distortion is estimated by modeling the PIM distortion with a polynomial model in the digital domain at baseband. However, this polynomial model requires a very large number of polynomial orders to accurately model the PIM distortion. For example, in J. Henrie, A. Christianson, W. J. Chappell, "Prediction of passive intermodulation from coaxial connectors in microwave networks," IEEE Trans. On Microwave Theory and Techniques, Vol. 56, No. 1, January 2008, pp. 209-216, it was determined that a $49^{th}$ order polynomial was required to accurately model the $AM_{Fund}$-$AM_{IM3}$ curve for the PIM of a Subminiature version A (SMA) connector, where $AM_{Fund}$-$AM_{IM3}$ represents a relationship between the amplitude of the input signal (fundamental) to the amplitude of the output IM3 signal. The required amount of digital resources required for the polynomial model increases as the number of orders of the polynomial model increases. As such, an accurate polynomial model of the PIM distortion requires, in many cases, a prohibitively large amount of digital resources.

Another approach to compensating for PIM distortion is described in N.M. Amin and M. Weber, "Transmit and receive crosstalk cancellation," 2010 $6^{th}$ International Conference on Emerging Technologies (ICET), Oct. 18-19, 2010, pp. 210-215. However, this approach assumes that the non-linear behavior of the PIM source (i.e., the shape of the $AM_{Fund}$-$AM_{IM3}$ and $AM_{Fund}$-$PM_{IM3}$ curves) is similar to that of the non-linearity of the power amplifier of the transmitter after power amplifier linearization has been applied. This assumption is very restrictive. As an example, a PIM source may have a certain ratio of $5^{th}$ to $3^{rd}$ order IMPs, but the linearized power amplifier may have a different ratio.

As such, there is a need for a system and method for compensating for PIM distortion in a receiver that overcomes the aforementioned problems associated with prior approaches.

SUMMARY

The present disclosure relates to compensation for Passive Intermodulation (PIM) distortion in a receiver. In one embodiment, a communication device includes a transmitter that is configured to receive a digital input signal and output a radio frequency transmit signal, a main receiver configured to receive a radio frequency receive signal and output a digital output signal, and a PIM compensation subsystem. The radio frequency receive signal includes PIM distortion that is a non-linear function of the radio frequency transmit signal output by the transmitter. In order to compensate for the PIM distortion, the PIM compensation subsystem receives the digital input signal of the transmitter, generates a digital PIM estimate signal that is an estimate of the PIM distortion in the digital output signal of the main receiver, and subtracts the digital PIM estimate signal from the digital output signal of the main receiver. The PIM compensation subsystem generates the digital PIM estimate signal based on the digital input signal of the transmitter according to a behavioral model of the transmitter, a source of the PIM distortion, and the main receiver. In one embodiment, the behavioral model is a simplified Volterra model. In one particular embodiment, the behavioral model is a generalized memory polynomial model, which is one type of simplified Volterra model.

In one embodiment, the PIM compensation subsystem includes a combined Digital Predistorter (DPD) and PIM estimate generation subsystem. The combined DPD and PIM estimate generation subsystem is configured to predistort the digital input signal of the transmitter according to a behavioral model of an inverse of a nonlinearity of the transmitter. In addition, the combined DPD and PIM estimate generation subsystem is configured to generate the digital PIM estimate signal based on the digital input signal of the transmitter according to the behavioral model of the transmitter, the source of the PIM distortion, and the main receiver. In one preferred embodiment, the combined DPD and PIM estimate generation subsystem includes one or more shared components used for both predistortion of the digital input signal and generation of the digital PIM estimate signal. In one embodiment, the behavioral models are simplified Volterra models (e.g., generalized memory polynomial models), and the one or more shared components are one or more shared regressors.

In one embodiment, the radio frequency transmit signal is a concurrent multi-band signal, and the digital input signal is a single wideband digital signal that includes a separate baseband representation for each frequency band of the concurrent multi-band signal.

In another embodiment, the radio frequency transmit signal is a concurrent multi-band signal, and the transmitter is configured to receive multiple digital input signals, each representing a different frequency band of the concurrent multi-band signal. The PIM compensation subsystem receives the multiple digital input signals of the transmitter and generates the digital PIM estimate signal based on the multiple digital input signals of the transmitter according to the behavioral model of the transmitter, the source of the PIM distortion, and the main receiver.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
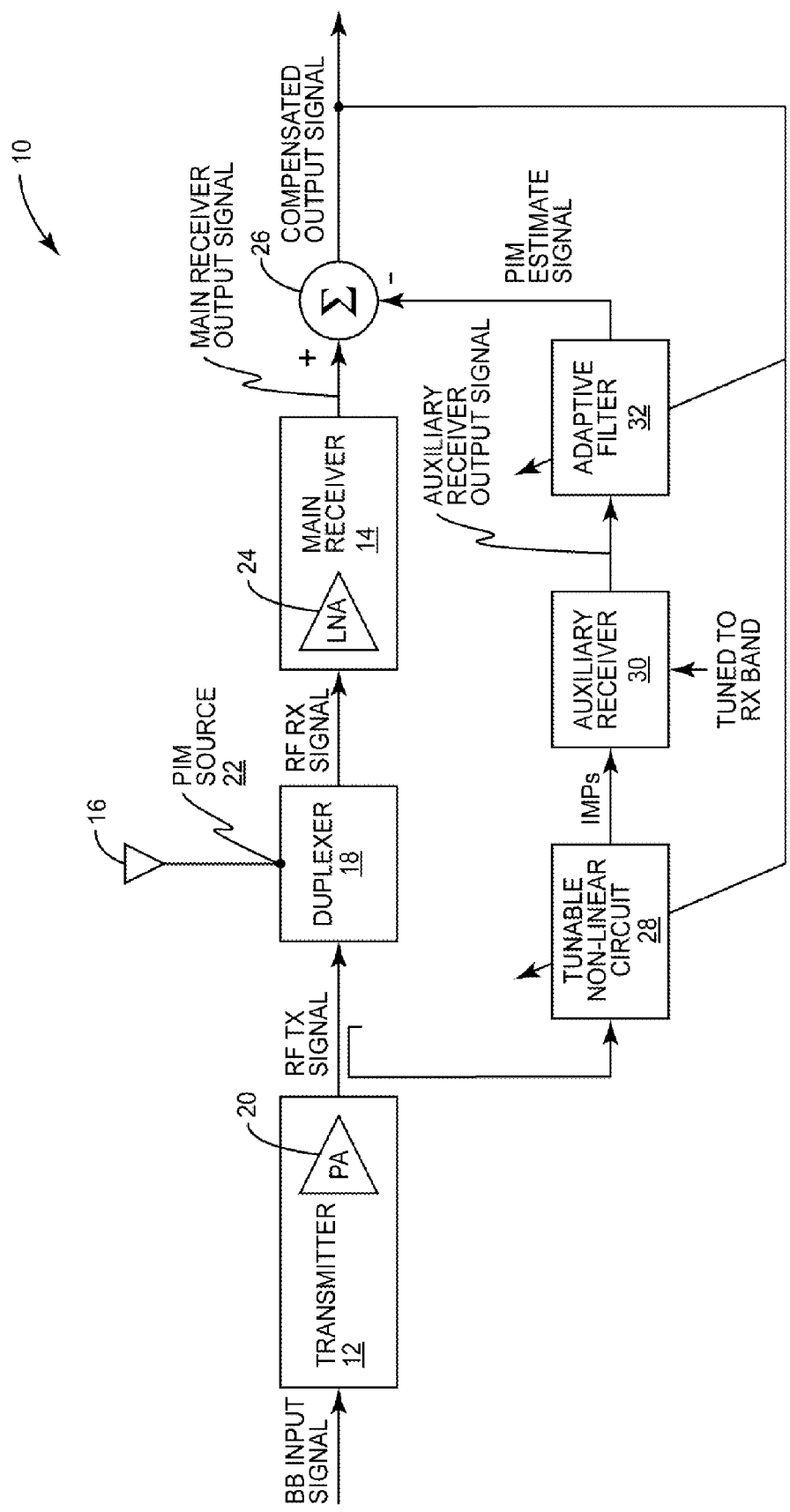
FIG. 1 illustrates a communication device including a receiver that compensates for Passive Intermodulation (PIM) distortion that is a nonlinear function of a transmit signal transmitted by a transmitter of the communication device according to a first embodiment of the present disclosure.

The present disclosure relates to compensation for Passive Intermodulation (PIM) distortion in a receiver. In this regard, FIG. 1 illustrates a communication device 10 that compensates for PIM distortion in a receiver of the communication device 10 according to one embodiment of the present disclosure. The communication device 10 may be a base station for a cellular communication network, but is not limited thereto. The communication device 10 is preferably a multi-carrier or multi-band communication device (e.g., a communication device that simultaneously operates in two different Long Term Evolution (LTE) frequency bands). As illustrated, the communication device 10 includes a transmitter 12 and a receiver 14 (also referred to herein as the main receiver 14) coupled to an antenna 16 via a duplexer 18. The transmitter 12 is referred to herein as a "companion transmitter" of the receiver 14. As used herein, the transmitter 12 is a "companion transmitter" of the receiver 14 if the transmitter 12 and the receiver 14 are coupled to the same antenna, which in FIG. 1 is the antenna 16. Typically, this occurs when the transmitter 12 and the receiver 14 are incorporated into a single transceiver.

The transmitter 12 includes conventional transmitter components such as, for example, up-conversion circuitry (not shown) and a power amplifier (PA) 20. The transmitter 12 operates to process (e.g., up-convert and amplify) a baseband (BB) input signal to output a radio frequency transmit (RF TX) signal. The radio frequency transmit signal then passes through the duplexer 18 to the antenna 16 such that the radio frequency transmit signal is transmitted by the communication device 10. After being output by the transmitter 12, the radio frequency transmit signal passes through a PIM source 22. In this example, the PIM source 22 is an antenna port of the duplexer 18 (i.e., an output of the PIM source 22 is coupled to the antenna 16). However, the PIM source 22 is not limited thereto. Rather, the PIM source 22 may be any passive component between an output of the transmitter 12 and the antenna 16 that includes some amount of non-linearity or even an object that is external to the communication device 10 (e.g., a fence). Due to the non-linearity of the PIM source 22, PIM is introduced into a radio frequency receive signal received at the antenna 16. The PIM includes a number of Intermodulation Products (IMPs) of the radio frequency transmit signal. The IMPs include $2^{nd}$ order IMPs, $3^{rd}$ order IMPs, etc.

The receiver 14 includes conventional receiver components such as, for example, a Low Noise Amplifier (LNA) 24, filters (not shown), down-conversion circuitry (not shown), and the like. The receiver 14 operates to process (e.g., amplify, filter, and down-convert) a radio frequency receive (RX) signal received from the antenna 16 via the duplexer 18 to output a main receiver output signal. The IMPs of the radio frequency transmit signal produced by the PIM source 22 that fall within a passband of the receiver 14 result in PIM distortion in the main receiver output signal that is output by the receiver 14. As discussed below, an estimate of the PIM distortion, which is referred to herein as a PIM estimate signal, is generated and provided to subtraction circuitry 26. The subtraction circuitry 26 operates to subtract the PIM estimate signal from the main receiver output signal in the digital domain to thereby provide a compensated output signal. The PIM estimate signal is generated such that the PIM distortion in the compensated output signal is minimized, or at least substantially reduced, as compared to the PIM distortion in the main receiver output signal.

In this embodiment, the PIM estimate signal is generated by a tunable non-linear circuit 28, an auxiliary receiver 30, and an adaptive filter 32 connected as shown. The tunable non-linear circuit 28 is not limited to any particular circuit and may be implemented using, for example, circuits conventionally used for pre- and post-distortion of power amplifiers. The tunable non-linear circuit 28 models the PIM source 22 to generate a number of IMPs using the radio frequency transmit signal obtained from the output of the transmitter 12. More specifically, the tunable non-linear circuit 28 processes the radio frequency transmit signal obtained from the output of the transmitter 12 to generate an output signal, which is referred to herein as an IMP signal, that includes a number of IMPs of the radio frequency transmit signal (e.g., $2^{nd}$ order, $3^{rd}$ order, etc.). Importantly, the tunable non-linear circuit 28 models the PIM source 22 in the analog domain at either radio frequency or some desired intermediate frequency. As such, the complexity of the circuitry used to model the PIM source 22 is substantially less complex than that required for a polynomial model approach that models the PIM or PIM distortion at baseband in the digital domain. Further, the tunable non-linear circuit 28 enables tuning to account for differences in the non-linear behavior of the PIM source 22 and the power amplifier 20 after any power amplifier linearization has been applied (i.e., the shape of the $AM_{Fund}$–$AM_{IM3}$ and $AM_{Fund}$–$PM_{IM3}$ curves).

The IMP signal output by the tunable non-linear circuit 28 is processed by the auxiliary receiver 30 to provide an auxiliary receiver output signal. The auxiliary receiver 30 models the receiver 14. More specifically, the auxiliary receiver 30 is tuned to the passband of the receiver 14 such that the auxiliary receiver output signal includes downconverted and digitized versions of only those IMPs that fall within the passband of the receiver 14.

The adaptive filter 32 then adaptively filters the auxiliary receiver output signal to provide the PIM estimate signal. The adaptive filter 32 models a difference between a main PIM path between the PIM source 22 and the output of the receiver 14 and an auxiliary PIM path between the output of the tunable non-linear circuit 28 and the output of the auxiliary receiver 30. Preferably, the tunable non-linear circuit 28 and the adaptive filter 32 are adaptively configured based on the compensated output signal such that the PIM distortion in the compensated output signal is minimized, or at least substantially reduced, as compared to that in the main receiver output signal. As an example, the tunable non-linear circuit 28 may be adaptively configured using a power minimization algorithm, and the adaptive filter 32 may be adaptively configured using a Least Mean Squares (LMS) algorithm or a variant thereof. Note, however, that these algorithms are examples only and are not intended to limit the scope of the present disclosure. Any suitable algorithms for adaptively configuring the tunable non-linear circuit 28 and the adaptive filter 32 in order to minimize, or at least substantially reduce, the PIM distortion in the compensated output signal may be used.

Figure 2:
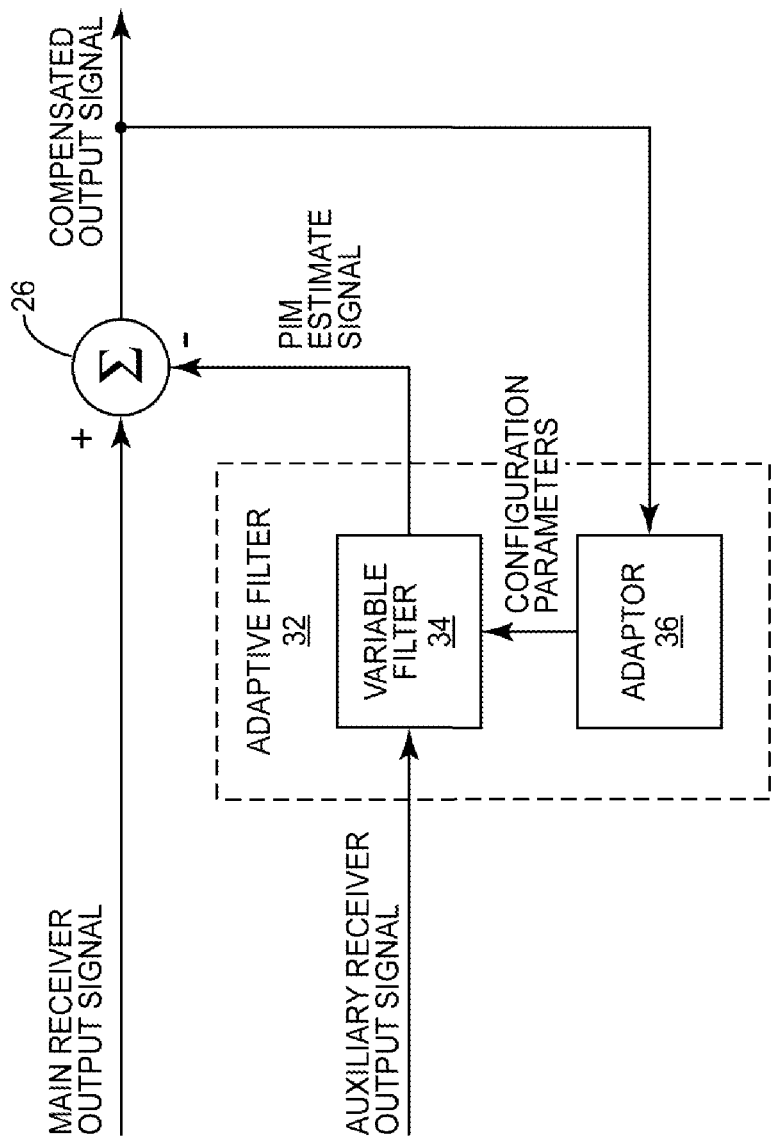
FIG. 2 is a more detailed illustration of one embodiment of the adaptive filter of FIG. 1.

FIG. 2 is a more detailed illustration of the adaptive filter 32 of FIG. 1 according to one embodiment of the present disclosure. In this embodiment, the adaptive filter 32 includes a variable filter 34 and an adaptor 36 connected as shown. In operation, the variable filter 34 filters the auxiliary receiver output signal to provide the PIM estimate signal. As discussed above, the subtraction circuitry 26 subtracts the PIM estimate signal from the main receiver output signal to provide the compensated output signal. Based on the compensated output signal, the adaptor 36 updates one or more configuration parameters (e.g., filter coefficients) for the variable filter 34 using a desired update, or adaptation, algorithm (e.g., an LMS algorithm or a variant thereof) in order to minimize a difference between the main receiver output signal and the PIM estimate signal. Note that adaptation may be performed more quickly if performed during a period of time when the main receiver output signal includes only the PIM distortion (i.e., when there is no received signal). However, adaptation may be performed even when the main receiver output signal includes a received signal in addition to the PIM distortion.

Figure 3:
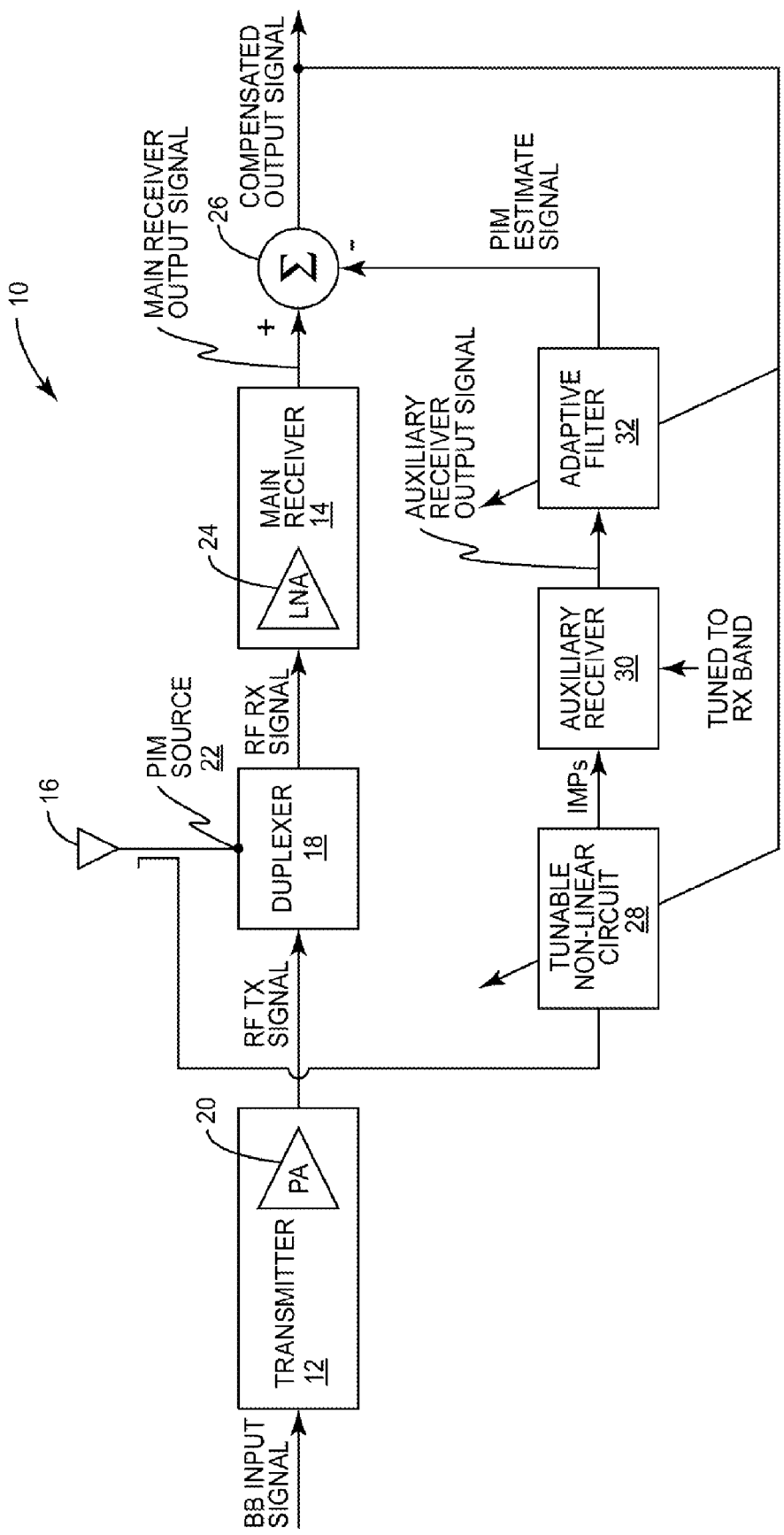
FIG. 3 illustrates a communication device including a receiver that compensates for PIM distortion that is a non-linear function of a transmit signal transmitted by a transmitter of the communication device according to a second embodiment of the present disclosure.

FIG. 3 illustrates the communication device 10 according to another embodiment of the present disclosure. This embodiment is substantially the same as that in FIG. 1 but where the input of the tunable non-linear circuit 28 is connected to the antenna port of the duplexer 18. In other words, the radio frequency transmit signal input to the tunable non-linear circuit 28 is obtained from the antenna port of the duplexer 18, which is also the PIM source 22. By tapping the radio frequency transmit signal at the PIM source 22, the most accurate version of the radio frequency transmit signal from which the PIM is produced is also input into the tunable non-linear circuit 28. It should also be noted that while FIGS. 1 and 3 illustrate embodiments where the radio frequency transmit signal is tapped at the output of the transmitter 12 and the antenna port of the duplexer 18, the present disclosure is not limited thereto. The radio frequency transmit signal may be tapped at any desired location between the output of the transmitter 12 and the antenna 16.

Figure 4:
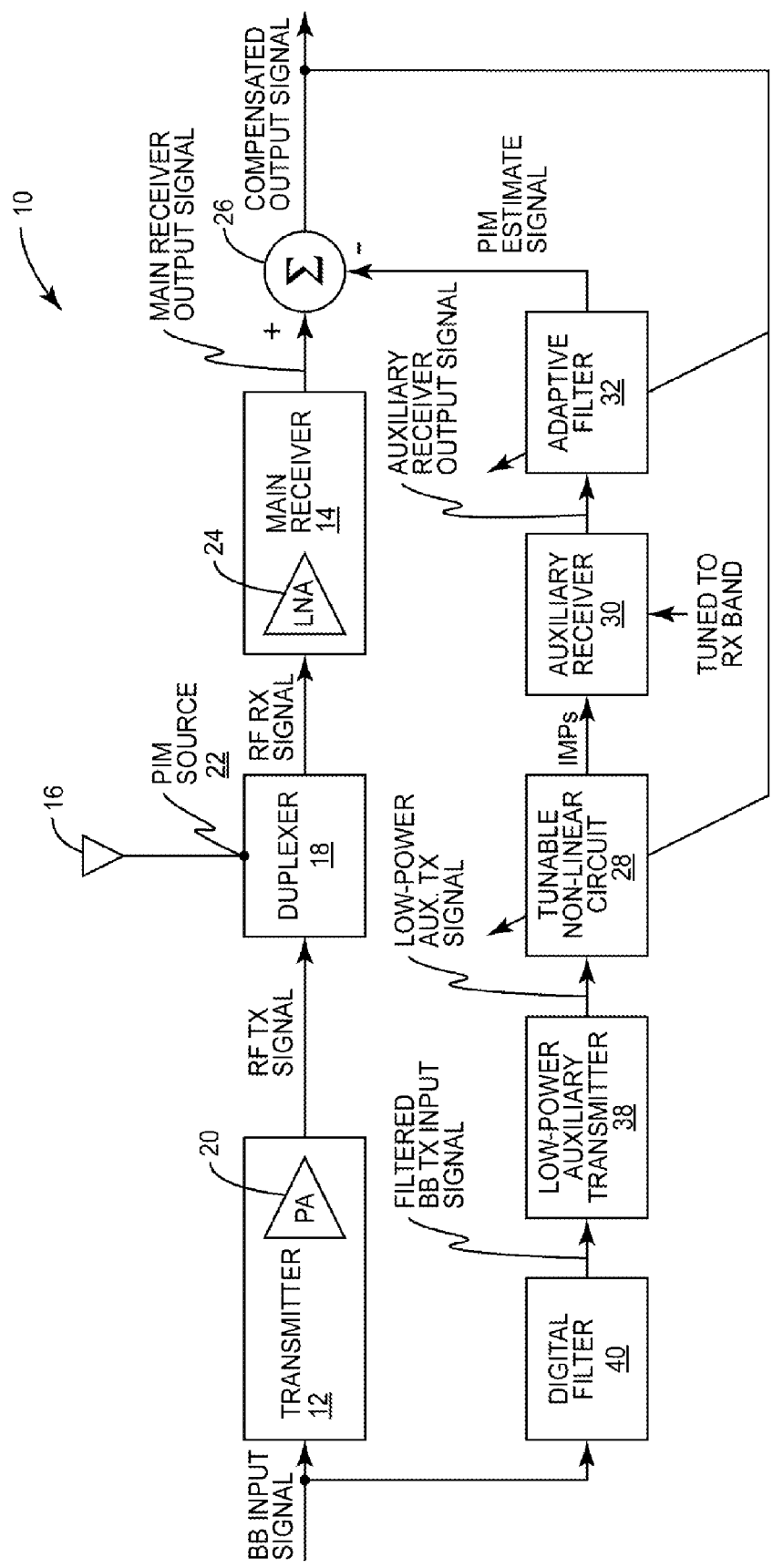
FIG. 4 illustrates a communication device including a receiver that compensates for PIM distortion that is a non-linear function of a transmit signal transmitted by a transmitter of the communication device according to a third embodiment of the present disclosure.

FIG. 4 illustrates the communication device 10 according to another embodiment of the present disclosure. This embodiment is substantially the same as that in FIG. 1 but where the input of the tunable non-linear circuit 28 is a low-power auxiliary transmit signal generated by a low-power auxiliary transmitter 38. As used herein, the "low-power" auxiliary transmitter 38 is a transmitter that models the transmitter 12 but that generates an output signal at a power level that is less than, and preferably substantially less than, a power level of the radio frequency transmit signal output by the transmitter 12.

In this embodiment, the baseband input signal of the transmitter 12 is also processed by an auxiliary transmit path to provide the low-power auxiliary transmit signal. More specifically, the baseband input signal is provided to a digital filter 40. The digital filter 40 is configured to model a difference between the auxiliary transmit path and the main transmit path through the transmitter 12 preferably including the path between the output of the transmitter 12 and the PIM source 22. The digital filter 40 may be an adaptive filter to permit modeling of the difference between the main and auxiliary transmit paths regardless of the location of the PIM source 22 in the main transmit path (e.g., at a connector at the output of the duplexer 18, external to the antenna 16, or the like).

The digital filter 40 outputs a filtered baseband transmit input signal, which is processed by the low-power auxiliary transmitter 38 to provide the low-power auxiliary transmit signal. In one embodiment, the low-power auxiliary transmitter 38 generates the low-power auxiliary transmit signal such that a carrier frequency of the low-power auxiliary transmit signal is the same as that of the radio frequency transmit signal. However, in another embodiment, the low-power auxiliary transmitter 38 generates the low-power auxiliary transmit signal such that the carrier frequency of the low-power auxiliary transmit signal is less than, and preferably substantially less than, that of the radio frequency transmit signal. For example, the low-power auxiliary transmit signal may be generated at 500 megahertz (MHz), whereas the radio frequency transmit signal may be generated at a significantly higher frequency (e.g., 2,000 MHz). As a result, the auxiliary transmit path may operate at a much lower frequency than the main transmit path, which in turn reduces cost and complexity.

The low-power auxiliary transmit signal is provided to the input of the tunable non-linear circuit 28. The tunable non-linear circuit 28, the auxiliary receiver 30, and the adaptive filter 32 then operate in the manner described above to generate the PIM estimate signal as a function of the low-power auxiliary transmit signal. The subtraction circuitry 26 then subtracts the PIM estimate signal from the main receiver output signal to provide the compensated output signal.

Figure 5:
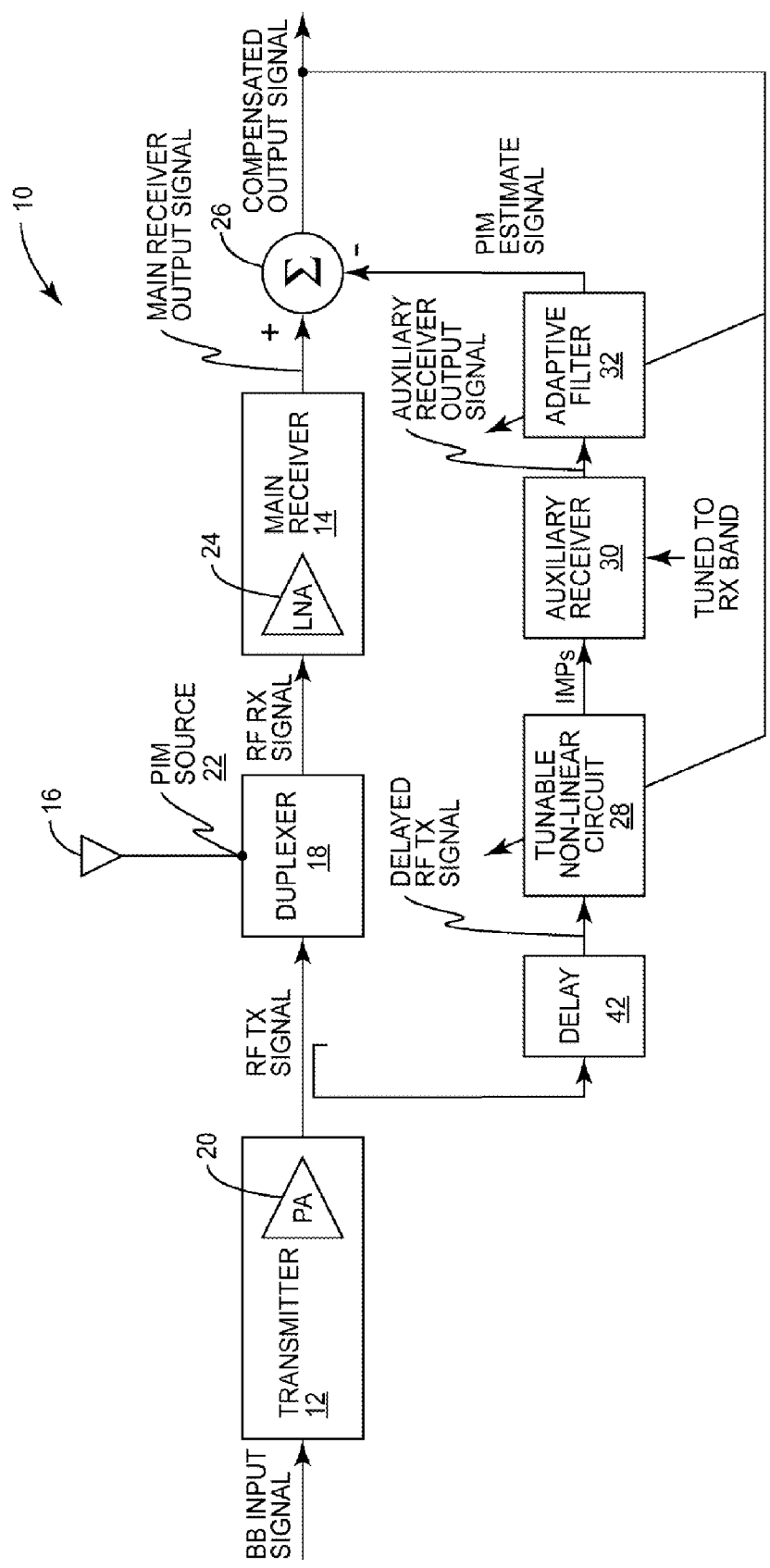
FIG. 5 illustrates a communication device including a receiver that compensates for PIM distortion that is a non-linear function of a transmit signal transmitted by a transmitter of the communication device according to a fourth embodiment of the present disclosure.

FIG. 5 illustrates the communication device 10 according to yet another embodiment of the present disclosure. This embodiment is substantially the same as that in FIG. 1 but where the input of the tunable non-linear circuit 28 is connected to the output of the transmitter 12 via a delay 42. In other words, in this embodiment, a delayed version of the radio frequency transmit signal is provided as the input of the tunable non-linear circuit 28. The delay 42 may be implemented as a filter. The delay 42 operates to add an additional group delay before the tunable non-linear circuit 28. This additional group delay may be configured to better match a group delay of the path between the output of the transmitter 12 and the PIM source 22. The group delay of the path between the output of the transmitter 12 and the PIM source 22 results in frequency dependent $AM_{Fund}-PM_{IM3}$ curves. The additional group delay added by the delay 42 reduces this dependency by matching out the delays.

Figure 6:
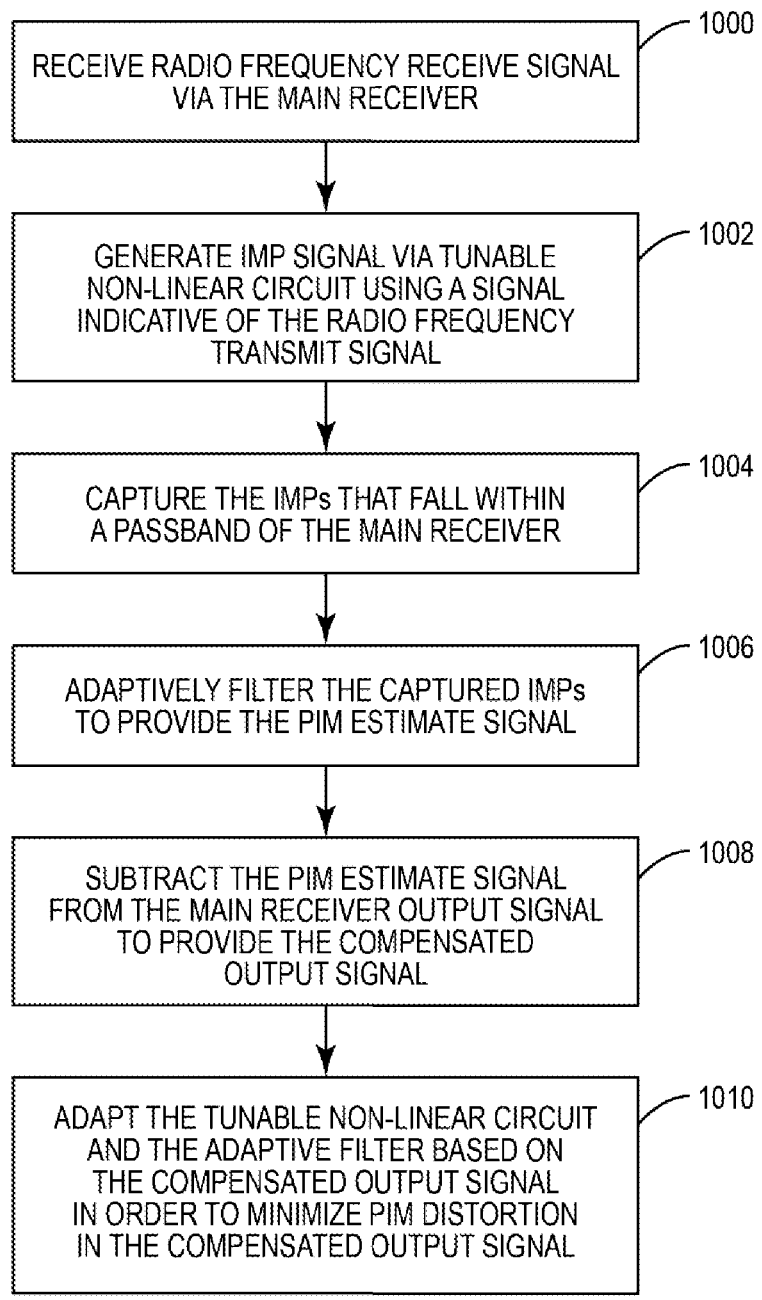
FIG. 6 is a flow chart that illustrates a process for compensating for PIM distortion in a receiver of a communication device, where the PIM distortion is a non-linear function of a transmit signal transmitted by a transmitter of the communication device, according to one embodiment of the present disclosure.

FIG. 6 is a flow chart illustrating a process for compensating for PIM distortion at the receiver 14 according to one embodiment of the present disclosure. As illustrated, the radio frequency receive signal from the antenna 16 is received by the receiver 14 to provide the main receiver output signal (block 1000). The radio frequency receive signal includes the IMPs of the radio frequency transmit signal generated at the PIM source 22. In addition, the IMP signal is generated by the tunable non-linear circuit 28 using the signal that is indicative of the radio frequency transmit signal output by the transmitter 12 (block 1002). The IMPs that are in the passband of the receiver 14 are then captured by the auxiliary receiver 30 (block 1004), and the resulting auxiliary receiver output signal is adaptively filtered by the adaptive filter 32 to provide the PIM estimate signal (block 1006). The PIM estimate signal is then subtracted from the main receiver output signal to thereby provide the compensated output signal (block 1008). Lastly, prior to and/or during operation, the tunable nonlinear circuit 28 and the adaptive filter 32 are adaptively configured to minimize, or at least substantially reduce, the PIM distortion in the compensated output signal (block 1010).

Figure 7:
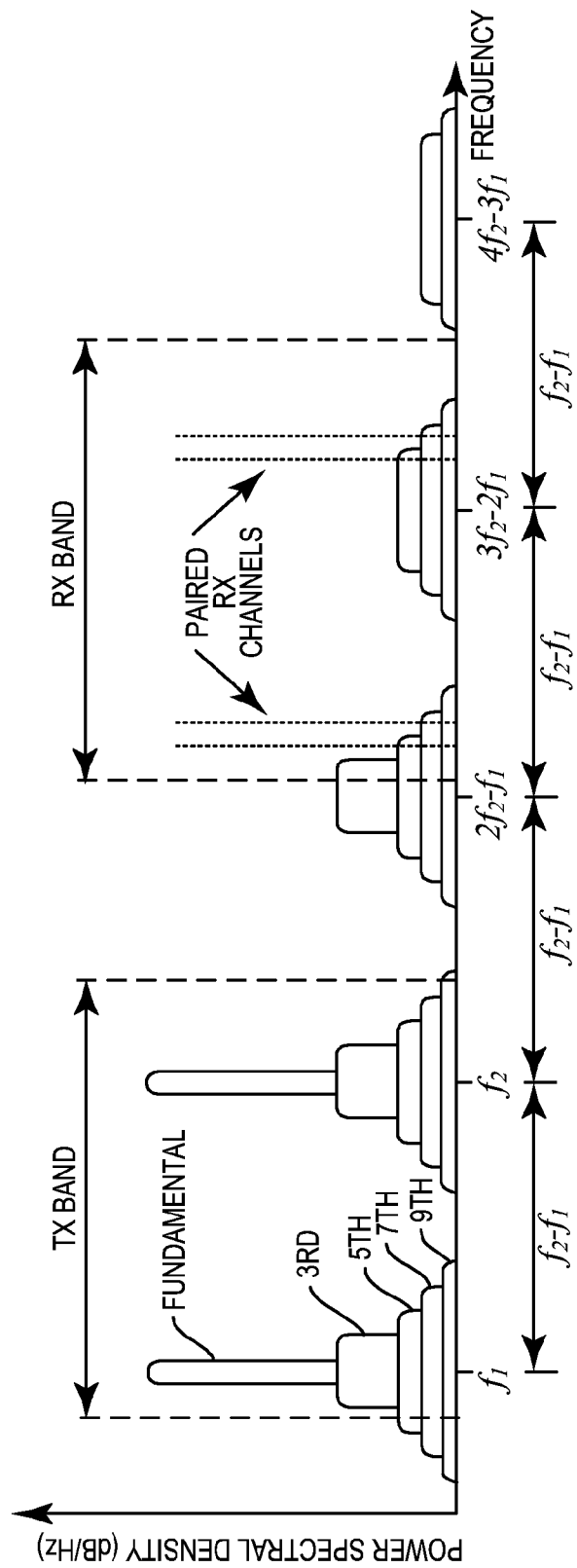
FIG. 7 illustrates one example of Intermodulation Distortion (IMD) in a transmit band of a concurrent multi-band transmitter as well as resulting PIM distortion in a paired receive channel.

The embodiments described above each include at least some analog components in the PIM compensation path (e.g., the tunable non-linear circuit 28 and components of the auxiliary receiver 30 of FIG. 1 are analog components). FIGS. 8 through 12 relate to embodiments that perform PIM compensation entirely in the digital domain (i.e., all-digital PIM compensation). However, before discussing the all-digital PIM compensation embodiments, a discussion of digital predistortion versus PIM compensation is provided. As illustrated in FIG. 7, a concurrent dual-band radio frequency transmit signal in a transmit band of a transmitter includes desired components at fundamental frequencies, or carrier frequencies $f_1$ and $f_2$, of the concurrent dual-band signal as well as third-order, fifth-order, seventh-order, and ninth-order Intermodulation Distortion (IMD) resulting from nonlinearity of the transmitter (e.g., nonlinearity of a PA of the transmitter). Digital predistortion is utilized to suppress the IMD across the entire transmit band generated by the transmitter. The TX filter removes the rest of the IMD outside of the transmit band. Conversely, a PIM source (e.g., a PIM source in the duplexer) results in IMPs of the concurrent dual-band radio frequency transmit signal in a receive band of a companion receiver that cannot be removed by the TX filter. In other words, the PIM source results in IMD in the receive band of the companion receiver. The goal of PIM compensation is to estimate and remove the IMD in the receive band, and particularly the paired RX channels. Notably, the dual-band signal of FIG. 7 is only an example. The same concepts apply to single-band signals and other multi-band signals.

Figure 8:
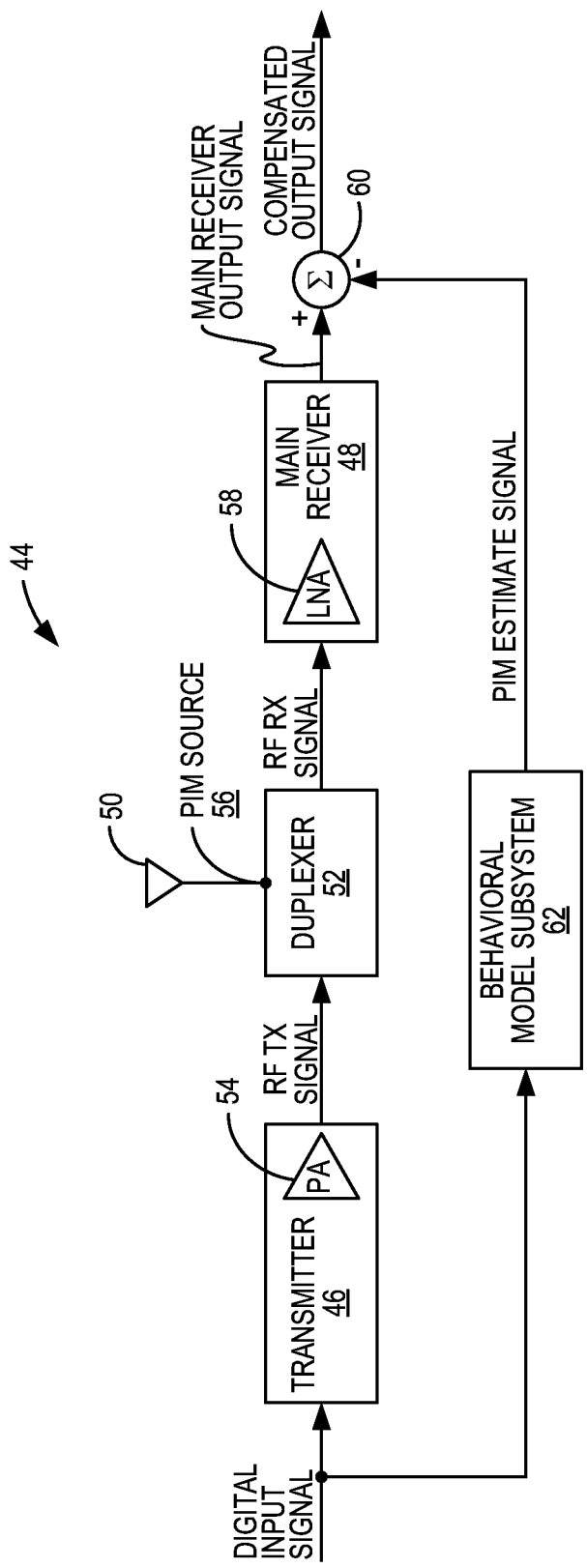
FIG. 8 illustrates a communication device that utilizes a behavioral model of a transmitter, a PIM source, and a receiver to cancel PIM in a digital output signal according to one embodiment of the present disclosure.

FIG. 8 illustrates a communication device 44 that includes an all-digital PIM compensation subsystem according to one embodiment of the present disclosure. The communication device 44 may be a base station for a cellular communication network, but is not limited thereto. The communication device 44 is preferably a multi-carrier or multi-band communication device (e.g., a communication device that simultaneously operates in two different LTE frequency bands). As illustrated, the communication device 44 includes a transmitter 46 and a receiver 48 (also referred to herein as the main receiver 48) coupled to an antenna 50 via a duplexer 52. The transmitter 46 is referred to herein as a "companion transmitter" of the receiver 48. As used herein, the transmitter 46 is a "companion transmitter" of the receiver 48 if the transmitter 46 and the receiver 48 are coupled to the same antenna, which in FIG. 8 is the antenna 50. Typically, this occurs when the transmitter 46 and the receiver 48 are incorporated into a single transceiver. Likewise, the receiver 48 is referred to herein as a "companion receiver" of the transmitter 46.

The transmitter 46 includes conventional transmitter components such as, for example, up-conversion circuitry (not shown) and a PA 54. The transmitter 46 operates to process (e.g., digital-to-analog convert, up-convert, and amplify, but not necessarily in that order) a digital input signal, which is preferably a digital baseband signal, to output a radio frequency transmit signal. The radio frequency transmit signal then passes through the duplexer 52 to the antenna 50 such that the radio frequency transmit signal is transmitted by the communication device 44. After being output by the transmitter 46, the radio frequency transmit signal passes through a PIM source 56. In this example, the PIM source 56 is an antenna port of the duplexer 52. However, the PIM source 56 is not limited thereto. Rather, the PIM source 56 may be any passive component between an output of the transmitter 46 and the antenna 50 that includes some amount of non-linearity or even an object that is external to the communication device 44 (e.g., a fence). Due to the non-linearity of the PIM source 56, PIM is introduced into a radio frequency receive signal received at the antenna 50. The PIM includes a number of IMPs of the radio frequency transmit signal. The IMPs include $2^{nd}$ order IMPs, $3^{rd}$ order IMPs, etc.

The receiver 48 includes conventional receiver components such as, for example, a LNA 58, filters (not shown), down-conversion circuitry (not shown), an analog-to-digital converter (not shown), and the like. The receiver 48 operates to process (e.g., amplify, filter, down-convert, and analog-to-digital convert) a radio frequency receive signal received from the antenna 50 via the duplexer 52 to output a digital output signal, which is referred to herein as a main receiver output signal. The IMPs of the radio frequency transmit signal produced by the PIM source 56 that fall within a passband of the receiver 48 result in PIM distortion in the main receiver output signal that is output by the receiver 48. As discussed below, an estimate of the PIM distortion, which is a digital signal referred to herein as a PIM estimate signal, is generated and provided to subtraction circuitry 60. The subtraction circuitry 60 operates to subtract the PIM estimate signal from the main receiver output signal in the digital domain to thereby provide a compensated output signal. The PIM estimate signal is generated such that the PIM distortion in the compensated output signal is minimized, or at least substantially reduced, as compared to the PIM distortion in the main receiver output signal.

In this embodiment, the PIM estimate signal is generated by a behavioral model subsystem 62 that models the transmitter 46, the PIM source 56, and the receiver 48. It should be noted that, together, the behavioral model subsystem 62 and the subtractor 60 are referred to herein as a PIM compensation subsystem. More specifically, the behavioral model subsystem 62 and the subtractor 60 form an all-digital PIM compensation subsystem. The behavioral model subsystem 62 receives the digital input signal of the transmitter 46 and processes the digital input signal according to a behavioral model of the transmitter 46, the PIM source 56, and the receiver 48 to generate the PIM estimate signal in the digital domain. In one preferred embodiment, the behavioral model is a simplification of the Volterra series (referred to herein as a simplified Volterra model), where the digital input signal of the transmitter is an input of the simplified Volterra model and the PIM estimate signal is an output of the simplified Volterra model. In one particular embodiment, the simplified Volterra model is a generalized memory polynomial model for a desired memory depth (e.g., a memory depth of 2).

As will be appreciated by one of ordinary skill in the art, the Volterra series is a popular mathematical technique used to model the behavior of a nonlinear function or an inverse, or reverse, of a non-linearity for digital predistortion. The Volterra series is a weighted sum of many regressor functions. The weights correspond to the Volterra kernels, and the regressors correspond to the products obtained by multiplying different combinations of delayed versions of the input signal of the Volterra series. Each regressor can include some complex conjugate terms. For example, the multiplicands of the regressors for a signal input Volterra series with a memory depth of 2 are: $x_{in}[n]$, $x^*_{in}[n]$, $x_{in}[n-1]$, $x^*_{in}[n-1]$. For a third-order nonlinearity, there are many regressors, two of which are: $x_{in}[n]x^*_{in}[n]x_{in}[n]$, $x_{in}[n]x_{in}[n-1]$, $x^*_{in}[n-1]$. While there are several different types of simplified Volterra models, one type of simplified Volterra model is a generalized memory polynomial model. Each regressor in a generalized memory polynomial is a function of only two delayed versions of the input signal. Notably, the term "generalized memory polynomial" has a technical meaning in the art of nonlinear modeling. In particular, a generalized memory polynomial is one type of simplified Volterra model, and a memory polynomial is one specific implementation of a generalized memory polynomial.

The behavioral model of the transmitter 46, the PIM source 56, and the receiver 48 is trained using any suitable training technique. For example, in the embodiment where the behavioral model is a generalized memory polynomial, the regressors are known for the desired memory depth and order, and the weights are trained such that the PIM distortion in the compensated output signal is minimized. Notably, the same techniques used to train simplified Volterra models used for digital predistortion may also be used to train the behavioral model for PIM compensation.

In one embodiment, the radio frequency transmit signal output by the transmitter 46 is a concurrent multi-band signal. As used herein, a concurrent multi-band signal is a signal that contains frequency components occupying multiple frequency bands (i.e., a first continuous frequency band, a second continuous frequency band, etc.) with no frequency components between adjacent frequency bands. In one embodiment, the concurrent multi-band signal includes two frequency bands and, as such, is also referred to herein as a concurrent dual-band signal. The digital input signal includes a separate baseband representation for each frequency band of the concurrent multi-band radio frequency transmit signal. In this embodiment, the transmitter 46 treats the concurrent multi-band radio frequency transmit signal as a single wideband signal. However, in an alternative embodiment, the transmitter 46 may receive a separate digital input signal for each frequency band of the concurrent multi-band radio frequency transmit signal, in which case the behavioral model subsystem 62 generates the PIM estimate signal based on digital input signals for the frequency bands of the concurrent multi-band radio frequency transmit signal according to a multi-input behavioral model. The multi-input behavioral model is preferably a multi-input simplified Volterra model (e.g., a multi-input generalized memory polynomial model).

Figure 9:
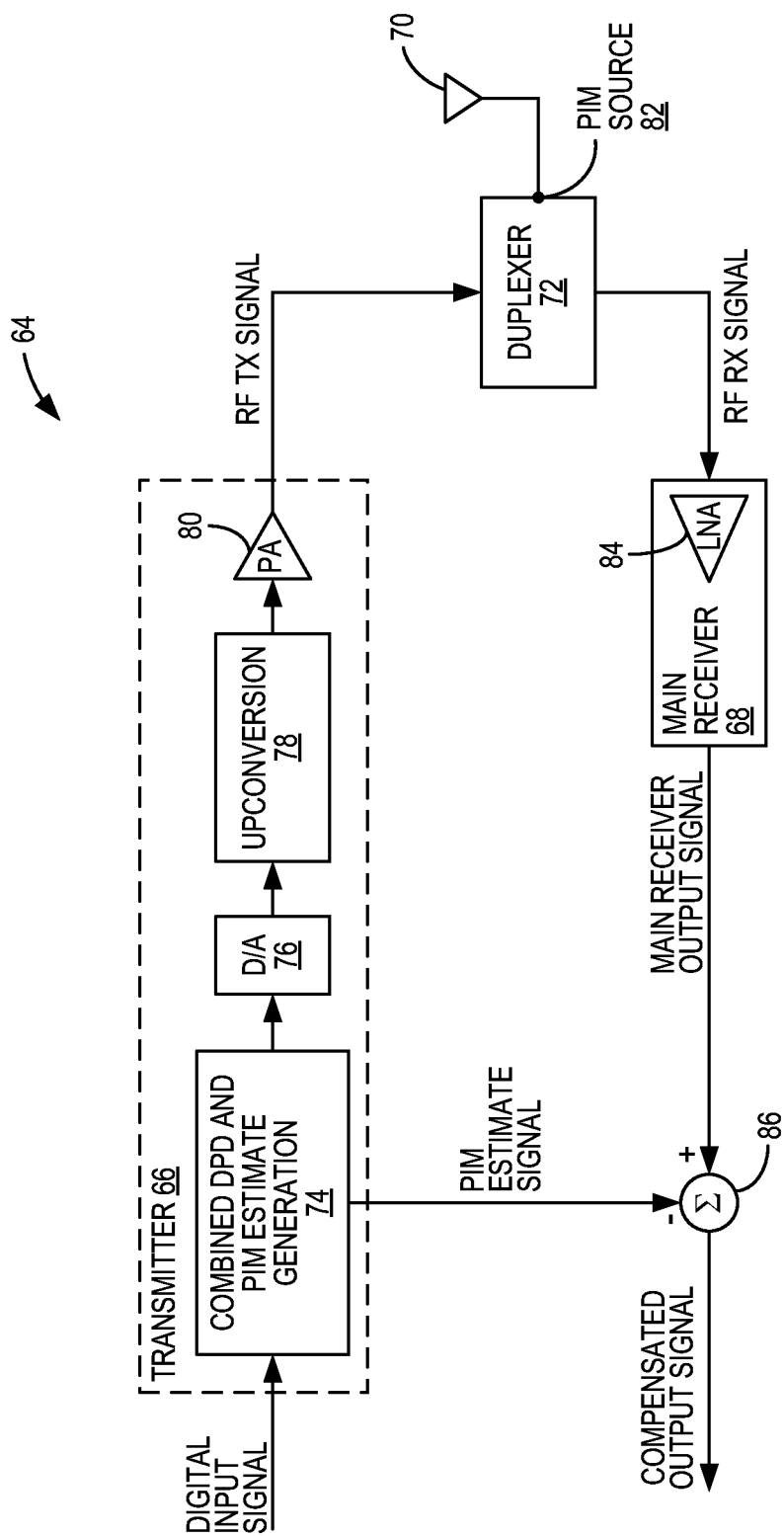
FIG. 9 illustrates a communication device that includes a combined Digital Predistortion (DPD) and PIM estimate generation subsystem according to one embodiment of the present disclosure.

FIG. 9 illustrates a communication device 64 that provides all-digital PIM compensation according to another embodiment of the present disclosure. The communication device 64 may be a base station for a cellular communication network, but is not limited thereto. The communication device 64 is preferably a multi-carrier or multi-band communication device (e.g., a communication device that simultaneously operates in two different LTE frequency bands). As illustrated, the communication device 64 includes a transmitter 66 and a receiver 68 (also referred to herein as the main receiver 68) coupled to an antenna 70 via a duplexer 72. The transmitter 66 is referred to herein as a "companion transmitter" of the receiver 68. Likewise, the receiver 68 is referred to herein as a "companion receiver" of the transmitter 66.

The transmitter 66 includes a combined digital predistortion (DPD) and PIM estimate generation subsystem 74, a digital-to-analog (D/A) converter 76, an upconversion subsystem 78, and a PA 80 connected as shown. The transmitter 66 operates to process (e.g., predistort, digital-to-analog convert, up-convert, and amplify, but not necessarily in that order) a digital input signal, which is preferably a digital baseband signal, to output a radio frequency transmit signal. The radio frequency transmit signal then passes through the duplexer 72 to the antenna 70 such that the radio frequency transmit signal is transmitted by the communication device 64. After being output by the transmitter 66, the radio frequency transmit signal passes through a PIM source 82. In this example, the PIM source 82 is an antenna port of the duplexer 72. However, the PIM source 82 is not limited thereto. Rather, the PIM source 82 may be any passive component between an output of the transmitter 66 and the antenna 70 that includes some amount of non-linearity or even an object that is external to the communication device 64 (e.g., a fence). Due to the non-linearity of the PIM source 82, PIM is introduced into a radio frequency receive signal received at the antenna 70. The PIM includes a number of IMPs of the radio frequency transmit signal. The IMPs include $2^{nd}$ order IMPs, $3^{rd}$ order IMPs, etc.

The receiver 68 includes conventional receiver components such as, for example, a LNA 84, filters (not shown), down-conversion circuitry (not shown), an analog-to-digital converter (not shown), and the like. The receiver 68 operates to process (e.g., amplify, filter, down-convert, and analog-to-digital convert) a radio frequency receive signal received from the antenna 70 via the duplexer 72 to output a digital output signal, which is referred to herein as a main receiver output signal. The IMPs of the radio frequency transmit signal produced by the PIM source 82 that fall within a passband of the receiver 68 result in PIM distortion in the main receiver output signal that is output by the receiver 68. As discussed below, an estimate of the PIM distortion, which is a digital signal referred to herein as a PIM estimate signal, is generated and provided to subtraction circuitry 86. The subtraction circuitry 86 operates to subtract the PIM estimate signal from the main receiver output signal in the digital domain to thereby provide a compensated output signal. The PIM estimate signal is generated such that the PIM distortion in the compensated output signal is minimized, or at least substantially reduced, as compared to the PIM distortion in the main receiver output signal.

In this embodiment, the PIM estimate signal is generated by the combined DPD and PIM estimate generation subsystem 74. It should be noted that, together, the combined DPD and PIM estimate generation subsystem 74 and the subtraction circuitry 86 are referred to herein as a PIM compensation subsystem and, more specifically, an all-digital PIM compensation subsystem. The combined DPD and PIM estimate generation subsystem 74 operates to predistort the digital input signal of the transmitter 66 according to a behavioral model of an inverse of a non-linearity of the transmitter 66 (e.g., a non-linearity of the PA 80) to provide a predistorted digital input signal that is subsequently digital-to-analog converted, upconverted, and amplified to provide the radio frequency transmit signal. In addition, the combined DPD and PIM estimate generation subsystem 74 processes the digital input signal of the transmitter 66 according to a behavioral model of the transmitter 66, the PIM source 82, and the receiver 68 to thereby generate the PIM estimate signal.

In this embodiment, the combined DPD and PIM estimate generation subsystem 74 uses one or more shared components to generate the predistorted digital input signal and the PIM estimate signal. More specifically, in one preferred embodiment, the behavioral model of the inverse of the non-linearity of the transmitter 66 is a simplified Volterra model, where the digital input signal of the transmitter 66 is an input of the simplified Volterra model and the predistorted digital input signal is an output of the simplified Volterra model. Likewise, the behavioral model of the transmitter 66, the PIM source 82, and the receiver 68 used to generate the PIM estimate signal is a simplified Volterra model, where the digital input signal of the transmitter 66 is an input of the simplified Volterra model and the PIM estimate signal is an output of the simplified Volterra model. In one particular embodiment, each of the simplified Volterra models is a generalized memory polynomial model for a desired memory depth (e.g., a memory depth of 2) and a desired order. In this embodiment where the behavioral models are simplified Volterra models (e.g., generalized memory polynomial models), the one or more shared components used to generate the predistorted digital input signal and the PIM estimate signal are one or more shared regressors. The one or more shared regressors are used for both the simplified Volterra model of the inverse of the non-linearity of the transmitter 66 and the simplified Volterra model of the transmitter 66, the PIM source 82, and the receiver 68 used to generate the PIM estimate signal. In this manner, cost and complexity is substantially reduced.

The behavioral model of the inverse of the non-linearity of the transmitter 66 and the behavioral model of the transmitter 66, the PIM source 82, and the receiver 68 are trained using any suitable training technique. For example, in the embodiment where the behavioral models are generalized memory polynomials, the regressors are known for the desired memory depth(s) and order(s), and the weights are trained such that IMD in the radio frequency transmit signal and that the PIM distortion in the compensated output signal are minimized. In one preferred embodiment, resources (i.e., hardware and/or software resources) utilized to train the behavioral models are shared. For example, in some embodiments, the same resources may be used to train the two behavioral models by switching the inputs of a training algorithm implemented by the resources.

In one embodiment, the radio frequency transmit signal output by the transmitter 66 is a concurrent multi-band signal. The digital input signal includes a separate baseband representation for each frequency band of the concurrent multi-band radio frequency transmit signal. In this embodiment, the transmitter 66 treats the concurrent multi-band radio frequency transmit signal as a single wideband signal.

Figure 10:
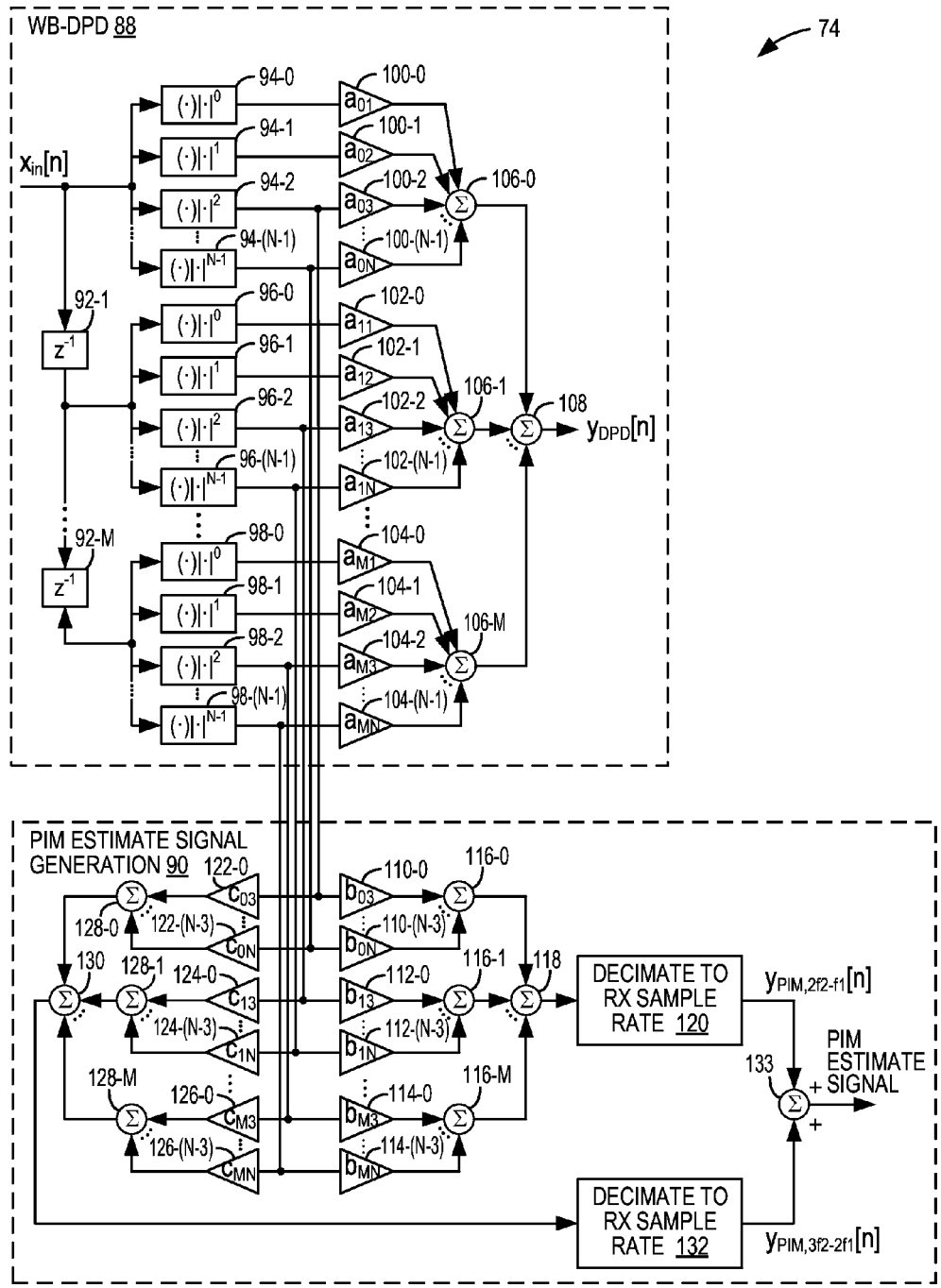
FIG. 10 is a more detailed illustration of one example of the combined DPD and PIM estimate generation subsystem of FIG. 9 according to one embodiment of the present disclosure.

FIG. 10 illustrates one example of the combined DPD and PIM estimate generation subsystem 74 of FIG. 9 according to one embodiment of the present disclosure. In this embodiment, the radio frequency transmit signal is a concurrent dual-band transmit signal having a first frequency band centered at frequency $f_1$ and a second frequency band centered at frequency $f_2$ in a manner similar to that illustrated in FIG. 7. The transmitter 66, and thus the combined DPD and PIM estimate generation subsystem 74, treats the dual-band radio frequency transmit signal as a single wideband signal that is represented by the digital input signal ($x_{in}$) of the transmitter 66. In addition, the receiver 68 has two paired receive channels near $3f_2-2f_1$ and $2f_2-f_1$, respectively, in a manner similar to that illustrated in FIG. 7. Note that FIG. 10 illustrates an embodiment of the combined DPD and PIM estimate generation subsystem 74 that utilizes memory polynomials. However, the combined DPD and PIM estimate generation subsystem 74 is not limited thereto. For example, the combined DPD and PIM estimate generation subsystem 74 may alternatively use another implementation of a generalized memory polynomial.

As illustrated, the combined DPD and PIM estimate generation subsystem 74 includes a wideband DPD (WB-DPD) subsystem 88 and a PIM estimate signal generation subsystem 90. In this embodiment, the WB-DPD subsystem 88 implements a memory polynomial model of the inverse of the non-linearity of the transmitter 66. More specifically, in this embodiment, the WB-DPD subsystem 88 includes a number of delays 92-1 through 92-M, regressors 94-0 through 94-(N−1), regressors 96-0 through 96-(N−1), regressors 98-0 through 98-(N−1), weighting functions 100-0 through 100-(N−1), weighting functions 102-0 through 102-(N−1), weighting functions 104-0 through 104-(N−1), summation nodes 106-0 through 106-M, and a summation node 108 connected as shown, where M is a memory depth of the generalized memory polynomial model and N is an order of the memory polynomial. Notably, the regressors 94-0 through 94-(N−1), the regressors 96-0 through 96-(N−1), and the regressors 98-0 through 98-(N−1) may not be implemented in hardware in exactly the same manner illustrated in FIG. 10. For example, a regressor that outputs $x_{in}[n]|x_{in}[n]|^2$ may use the result of a previous regressor that outputs $x_{in}[n]|x_{in}[n]|^1$ and multiply it by $|x_{in}[n]|$. Further, the regressors 94-0 through 94-(N−1), the regressors 96-0 through 96-(N−1), and the regressors 98-0 through 98-(N−1) may be more complex functions such as, for example, orthogonal functions. It should also be noted that while both odd and even linear orders are illustrated, in an alternative embodiment, only odd orders may be used.

In operation, the digital input signal ($x_{in}$) of the transmitter 66 is passed through the regressors 94-0 through 94-(N−1) and the resulting regressor output signals are weighted by the weighting functions 100-0 through 100-(N−1) and then summed by the summation node 106-0. Likewise, a first delayed version of the digital input signal ($x_{in}$) output by the delay 92-1 is passed through the regressors 96-0 through 96-(N−1) and the resulting regressor output signals are weighted by the weighting functions 102-0 through 102-(N−1) and then summed by the summation node 106-1. In the same manner, a final delayed version of the digital input signal ($x_{in}$) output by the delay 92-M is passed through the regressors 98-0 through 98-(N−1) and the resulting regressor output signals are weighted by the weighting functions 104-0 through 104-(N−1) and then summed by the summation node 106-M. The outputs of the summation nodes 106-1 through 106-M are summed by the summation node 108 to provide the predistorted digital input signal ($y_{DPD}$).

The PIM estimate signal generation subsystem 90 implements the memory polynomial model of the transmitter 66, the PIM source 82, and the receiver 68 utilizing the outputs of some of the regressors 94-0 through 94-(N−1), 96-0 through 96-(N−1), and 98-0 through 98-(N−1) of the WB-DPD subsystem 88. In this manner, the PIM estimate signal generation subsystem 90 re-uses or shares some of the regressors 94-0 through 94-(N−1), 96-0 through 96-(N−1), and 98-0 through 98-(N−1) of the WB-DPD subsystem 88.

The PIM estimate signal generation subsystem 90 includes weighting functions 110-0 through 110-(N−3), weighting functions 112-0 through 112-(N−3), weighting functions 114-0 through 114-(N−3), summation nodes 116-0 through 116-M, and summation node 118 connected as shown. The outputs of the regressors 94-2 through 94-(N−1) are connected to inputs of the weighting functions 110-0 through 110-(N−3), respectively. The outputs of the regressors 96-2 through 96-(N−1) are connected to inputs of the weighting functions 112-0 through 112-(N−3), and the outputs of the regressors 98-2 through 98-(N−1) are connected to inputs of the weighting functions 114-0 through 114-(N−3), respectively. In operation, the output signals of the regressors 94-2 through 94-(N−1) are weighted by the weighting functions 110-0 through 110-(N−3), respectively, and then summed by the summation node 116-0. The output signals of the regressors 96-2 through 96-(N−1) are weighted by the weighting functions 112-0 through 112-(N−3), respectively, and then summed by the summation node 116-1. Likewise, the output signals of the regressors 98-2 through 98-(N−1) are weighted by the weighting functions 114-0 through 114-(N−3), respectively, and then combined by the summation node 116-M. The output signals of the summation nodes 116-0 through 116-M are summed by the summation node 118, and the resulting signal is decimated to a sampling rate of the receiver 68 by a decimator 120 to thereby provide a first component of the PIM estimate signal for the paired receive channel centered near $2f_2-f_1$.

Likewise, the PIM estimate signal generation subsystem 90 includes weighting functions 122-0 through 122-(N−3), weighting functions 124-0 through 124-(N−3), weighting functions 126-0 through 126-(N−3), summation nodes 128-0 through 128-M, and summation node 130 connected as shown. The outputs of the regressors 94-2 through 94-(N−1) are connected to inputs of the weighting functions 122-0 through 122-(N−3), respectively. The outputs of the regressors 96-2 through 96-(N−1) are connected to inputs of the weighting functions 124-0 through 124-(N−3), and the outputs of the regressors 98-2 through 98-(N−1) are connected to inputs of the weighting functions 126-0 through 126-(N−3), respectively. In operation, the output signals of the regressors 94-2 through 94-(N−1) are weighted by the weighting functions 122-0 through 122-(N−3), respectively, and then summed by the summation node 128-0. The output signals of the regressors 96-2 through 96-(N−1) are weighted by the weighting functions 124-0 through 124-(N−3), respectively, and then summed by the summation node 128-1. Likewise, the output signals of the regressors 98-2 through 98-(N−1) are weighted by the weighting functions 126-0 through 126-(N−3), respectively, and then combined by the summation node 128-M. The output signals of the summation nodes 128-0 through 128-M are summed by the summation node 130, and the resulting signal is decimated to a sampling rate of the receiver 68 by a decimator 132 to thereby provide a second component of the PIM estimate signal for the paired receive channel centered near $3f_2-2f_1$. The first and second components of the PIM estimate signal are combined by a summation node 133 to provide the PIM estimate signal.

The memory polynomial models implemented by the WB-DPD subsystem 88 and the PIM estimate signal generation subsystem 90 are trained using any suitable training technique. More specifically, the regressors 94-0 through 94-(N−1), the regressors 96-0 through 96-(N−1), and the regressors 98-0 through 98-(N−1) are known for the desired memory depth and order. A suitable training algorithm is used to train weighting factors $a_{01}$ through $a_{0N}$, $a_{11}$ through $a_{1N}$, $a_{M1}$ through $a_{MN}$, $b_{03}$ through $b_{0N}$, $b_{13}$ through $b_{1N}$, $b_{M3}$ through $b_{MN}$, $c_{03}$ through $c_{0N}$, $c_{13}$ through $c_{1N}$, and $c_{M3}$ through $c_{MN}$ such that IMD in the radio frequency transmit signal and the PIM distortion in the main receiver output signal are minimized. In one preferred embodiment, resources (i.e., hardware and/or software resources) utilized to train the memory models are shared. For example, in some embodiments, the same resources may be used to train the two memory models by switching the inputs of a training algorithm implemented by the resources.

Figure 11:
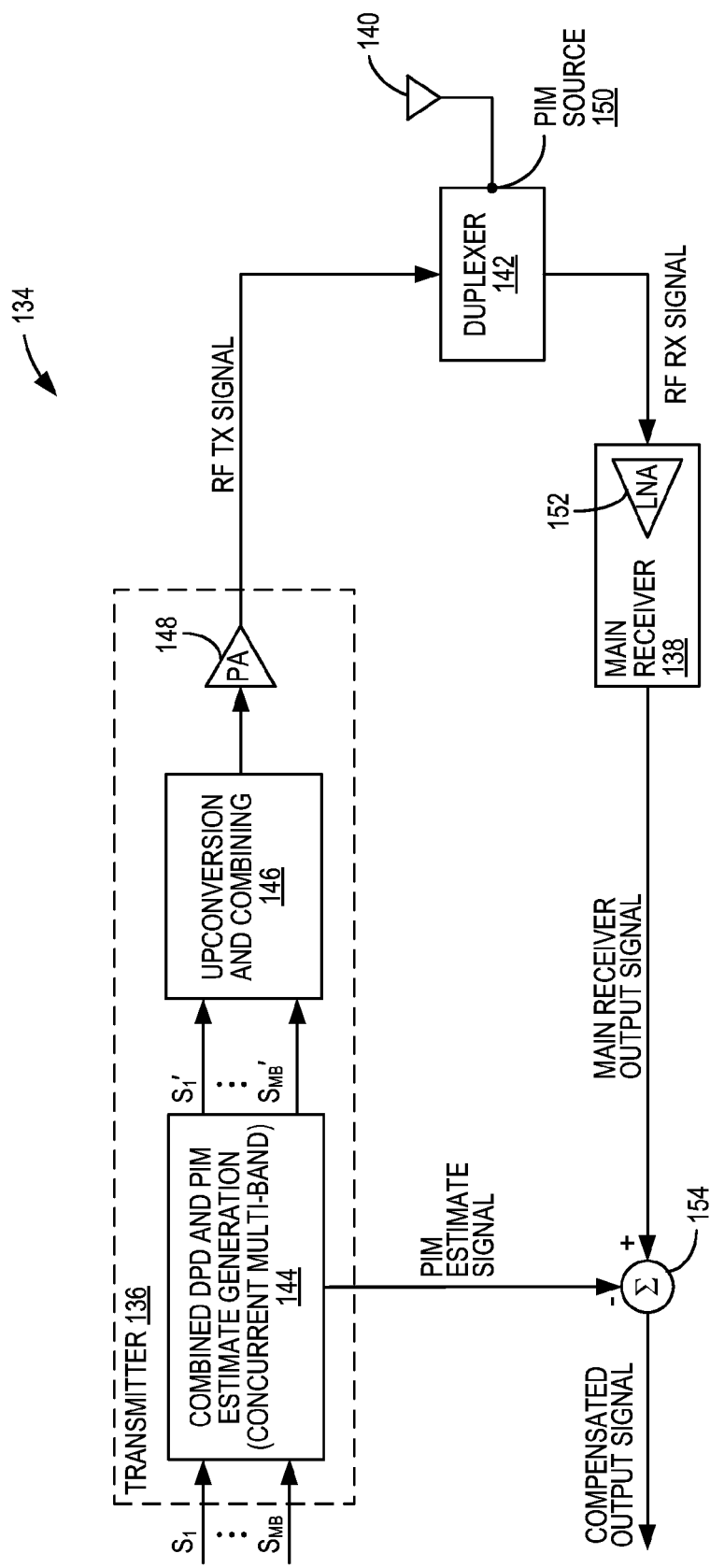
FIG. 11 illustrates a communication device that includes a combined DPD and PIM estimate generation subsystem for a concurrent multi-band transmit signal according to one embodiment of the present disclosure.

FIG. 11 illustrates a communication device 134 that provides all-digital PIM compensation according to another embodiment of the present disclosure. The communication device 134 may be a base station for a cellular communication network, but is not limited thereto. The communication device 134 is preferably a multi-carrier or multi-band communication device (e.g., a communication device that simultaneously operates in two different LTE frequency bands). As illustrated, the communication device 134 includes a transmitter 136 and a receiver 138 (also referred to herein as the main receiver 138) coupled to an antenna 140 via a duplexer 142. The transmitter 136 is referred to herein as a "companion transmitter" of the receiver 138. Likewise, the receiver 138 is referred to herein as a "companion receiver" of the transmitter 136.

The transmitter 136 includes a combined DPD and PIM estimate generation subsystem 144, an upconversion and combining subsystem 146, and a PA 148 connected as shown. The transmitter 136 operates to process (e.g., predistort, digital-to-analog convert, up-convert, combine, and amplify, but not necessarily in that order) multiple digital input signals ($S_1$ through $S_{MB}$), which are preferably digital baseband signals, to output a concurrent multi-band radio frequency transmit signal. Each of the digital input signals ($S_1$ through $S_{MB}$) is a digital representation of a signal for a different frequency band of the $N_{MB}$ frequency bands of the concurrent multi-band radio frequency transmit signal. The radio frequency transmit signal then passes through the duplexer 142 to the antenna 140 such that the radio frequency transmit signal is transmitted by the communication device 134. After being output by the transmitter 136, the radio frequency transmit signal passes through a PIM source 150. In this example, the PIM source 150 is an antenna port of the duplexer 142. However, the PIM source 150 is not limited thereto. Rather, the PIM source 150 may be any passive component between an output of the transmitter 136 and the antenna 140 that includes some amount of non-linearity or even an object that is external to the communication device 134 (e.g., a fence). Due to the non-linearity of the PIM source 150, PIM is introduced into a radio frequency receive signal received at the antenna 140. The PIM includes a number of IMPs of the radio frequency transmit signal. The IMPs include $2^{nd}$ order IMPs, $3^{rd}$ order IMPs, etc.

The receiver 138 includes conventional receiver components such as, for example, a LNA 152, filters (not shown), down-conversion circuitry (not shown), an analog-to-digital converter (not shown), and the like. The receiver 138 operates to process (e.g., amplify, filter, down-convert, and analog-to-digital convert) the radio frequency receive signal received from the antenna 140 via the duplexer 142 to output a digital output signal, which is referred to herein as a main receiver output signal. The IMPs of the radio frequency transmit signal produced by the PIM source 150 that fall within a passband of the receiver 138 result in PIM distortion in the main receiver output signal that is output by the receiver 138. As discussed below, an estimate of the PIM distortion, which is a digital signal referred to herein as a PIM estimate signal, is generated and provided to subtraction circuitry 154. The subtraction circuitry 154 operates to subtract the PIM estimate signal from the main receiver output signal in the digital domain to thereby provide a compensated output signal. The PIM estimate signal is generated such that the PIM distortion in the compensated output signal is minimized, or at least substantially reduced, as compared to the PIM distortion in the main receiver output signal.

In this embodiment, the PIM estimate signal is generated by the combined DPD and PIM estimate generation subsystem 144. It should be noted that, together, the combined DPD and PIM estimate generation subsystem 144 and the subtraction circuitry 154 are referred to herein as a PIM compensation subsystem, and more specifically an all-digital PIM compensation subsystem. The combined DPD and PIM estimate generation subsystem 144 operates to predistort the digital input signals of the transmitter 136 according to a behavioral model of an inverse of a non-linearity of the transmitter 136 (e.g., a non-linearity of the PA 148) to provide predistorted digital input signals that are subsequently up-converted, combined, and digital-to-analog converted (but not necessarily in that order) by the upconversion and combining subsystem 146 and then amplified by the PA 148 to provide the concurrent multi-band radio frequency transmit signal. In addition, the combined DPD and PIM estimate generation subsystem 144 operates to process the digital input signals of the transmitter 136 according to a behavioral model of the transmitter 136, the PIM source 150, and the receiver 138 to thereby generate the PIM estimate signal.

In this embodiment, the combined DPD and PIM estimate generation subsystem 144 uses one or more shared components to generate the predistorted digital input signals and the PIM estimate signal. More specifically, in one preferred embodiment, the behavioral model of the inverse of the non-linearity of the transmitter 136 is a simplified Volterra model having multiple inputs, where the digital input signals of the transmitter 136 are the inputs of the simplified Volterra model and the predistorted digital input signals are outputs of the simplified Volterra model. Likewise, the behavioral model of the transmitter 136, the PIM source 150, and the receiver 138 used to generate the PIM estimate signal is a simplified Volterra model having multiple inputs, where the digital input signals of the transmitter 136 are inputs of the simplified Volterra model and the PIM estimate signal is an output of the simplified Volterra model. In one particular embodiment, each of the simplified Volterra models is a generalized memory polynomial model for a desired memory depth (e.g., a memory depth of 2) and order. In this embodiment where the behavioral models are simplified Volterra models (e.g., generalized memory polynomial models), the one or more shared components used to generate the predistorted digital input signals and the PIM estimate signal are one or more shared regressors. The one or more shared regressors are used for both the simplified Volterra model of the inverse of the non-linearity of the transmitter 136 and the simplified Volterra model of the transmitter 136, the PIM source 150, and the receiver 138 used to generate the PIM estimate signal. In this manner, cost and complexity is substantially reduced.

Figure 12A:
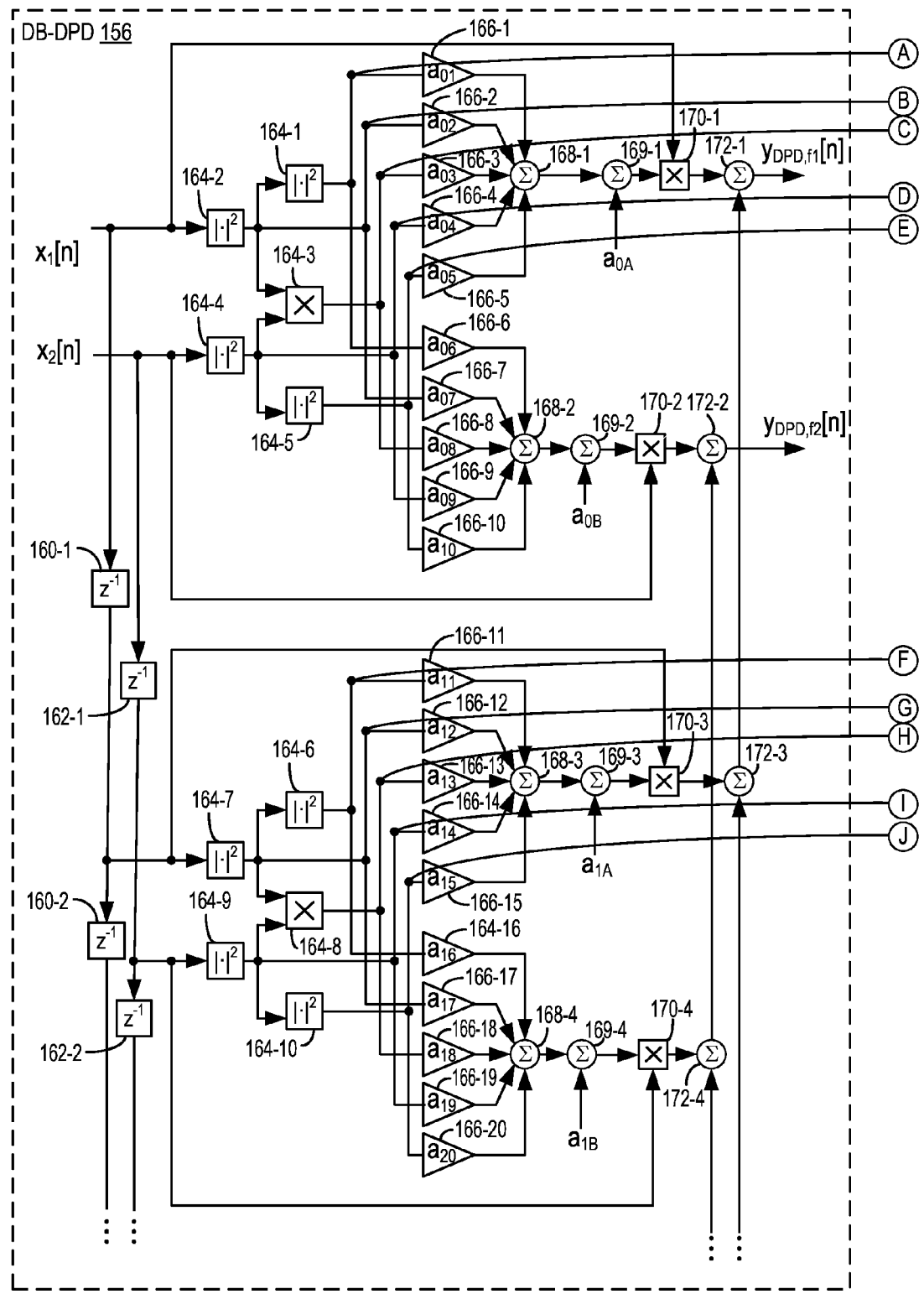
FIGS. 12A and 12B are a more detailed illustration of one example of the combined DPD and PIM estimate generation subsystem of FIG. 11 according to one embodiment of the present disclosure.
Figure 12B:
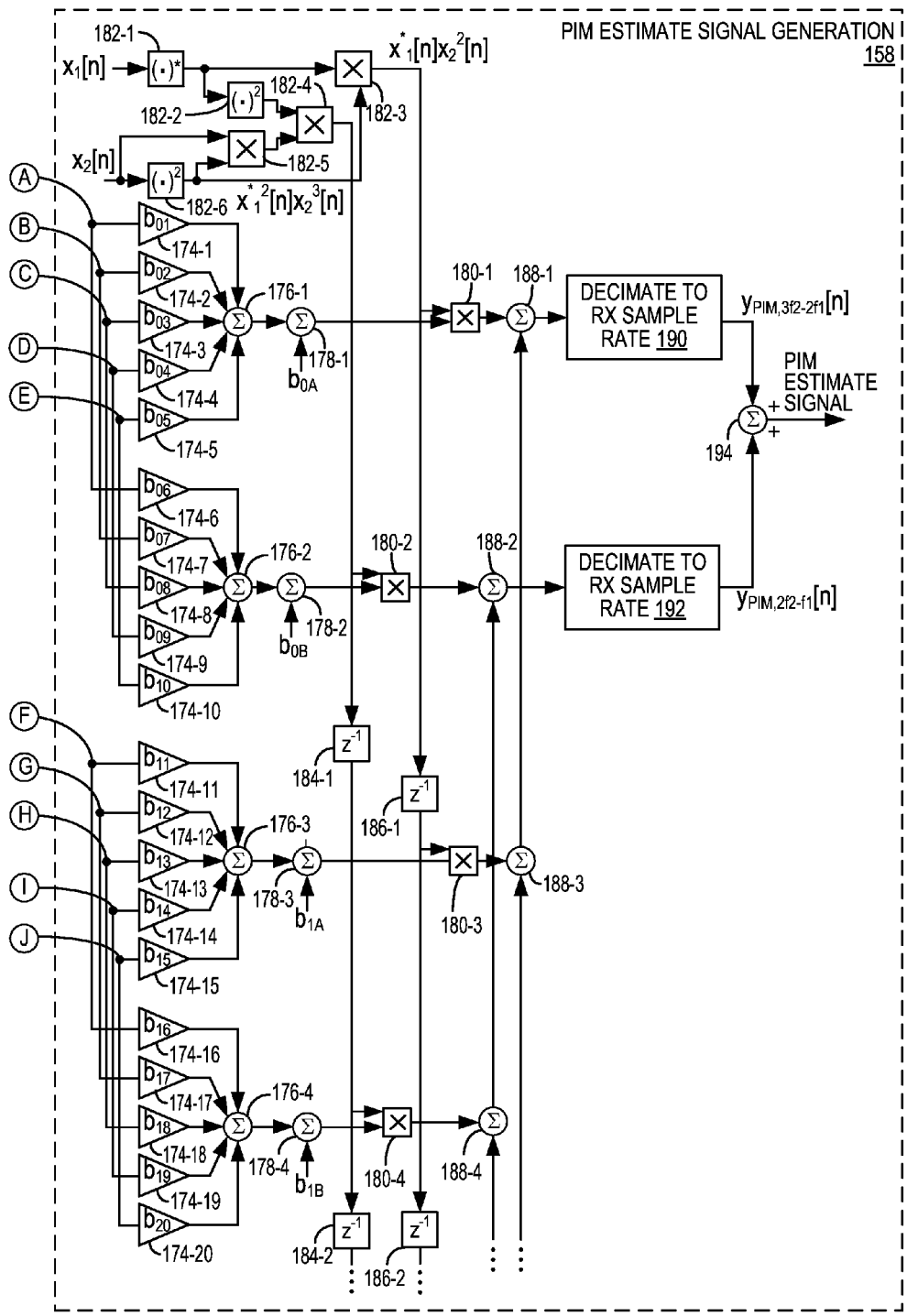

FIGS. 12A and 12B illustrate one example of the combined DPD and PIM estimate generation subsystem 144 of FIG. 11 according to one embodiment of the present disclosure. In this embodiment, the concurrent multi-band radio frequency transmit signal is a concurrent dual-band transmit signal having a first frequency band centered at frequency $f_1$ and a second frequency band centered at frequency $f_2$ in a manner similar to that illustrated in FIG. 7. In addition, the receiver 138 has two paired receive channels near $3f_2-2f_1$ and $2f_2-f_1$, respectively, in a manner similar to that illustrated in FIG. 7. Note that FIGS. 12A and 12B illustrate an embodiment of the combined DPD and PIM estimate generation subsystem 144 that utilizes memory polynomials. However, the combined DPD and PIM estimate generation subsystem 144 is not limited thereto. For example, the combined DPD and PIM estimate generation subsystem 144 may alternatively use another implementation of a generalized memory polynomial.

As illustrated, the combined DPD and PIM estimate generation subsystem 144 includes a dual-band DPD (DB-DPD) subsystem 156 (FIG. 12A) and a PIM estimate signal generation subsystem 158 (FIG. 12B). In this embodiment, the DB-DPD subsystem 156 implements a memory polynomial model of the inverse of the non-linearity of the transmitter 136 for a concurrent dual-band signal. More specifically, in this embodiment, the DB-DPD subsystem 156 includes delays 160-1 and 160-2 for the first digital input signal ($x_1$), delays 162-1 and 162-2 for the second digital input signal ($x_2$), a number of regressors formed by partial regressor components 164-1 through 164-10, weighting functions 166-1 through 166-20, summation nodes 168-1 through 168-4, summation nodes 169-1 through 169-4, multipliers 170-1 through 170-4, and summation nodes 172-1 through 172-4 connected as shown. If the desired memory depth is greater than 1, then the DB-DPB subsystem 156 will have additional delays, regressor components, weighting functions, multipliers, and summation nodes connected in the same manner for the additional memory depth.

The partial regressor components 164-1 and 164-2 form a first partial regressor, the partial regressor component 164-2 forms a second partial regressor, the partial regressor components 164-2 and 164-3 form a third partial regressor component, and so on. Note that while the regressors are illustrated as being relatively simple, the regressors may be more complex. For example, the regressors may alternatively be orthogonal. Further, only odd orders are illustrated, in an alternative embodiment, both odd and even orders are used. In operation, the digital input signals ($x_1$ and $x_2$) of the transmitter 136 are passed through the delays 160-1 and 160-2 for the first digital input signal ($x_1$), the delays 162-1 and 162-2 for the second digital input signal ($x_2$), the partial regressor components 164-1 through 164-10, the weighting functions 166-1 through 166-20, the summation nodes 168-1 through 168-4, the summation nodes 169-1 through 169-4, the multipliers 170-1 through 170-4, and the summation nodes 172-1 through 172-4 to provide predistorted digital input signals ($y_{DPD,f1}$ and $y_{DPD,f2}$).

The PIM estimate signal generation subsystem 158 (FIG. 12B) implements a memory polynomial model of the transmitter 136, the PIM source 150, and the receiver 138 utilizing the outputs of some of the partial regressors formed by the partial regressor components 164-1 through 164-10 of the DB-DPD subsystem 156. In this manner, the PIM estimate signal generation subsystem 158 re-uses some of the partial regressors of the DB-DPD subsystem 156. In this particular embodiment, some of the partial regressors of the DB-DPD subsystem 156 are used as partial regressors for the memory polynomial model implemented by the PIM estimate signal generation subsystem 158.

In this embodiment, the PIM estimate signal generation subsystem 158 includes weighting functions 174-1 through 174-20, summation nodes 176-1 through 176-4, summation nodes 178-1 through 178-4, multipliers 180-1 through 180-4, additional partial regressor components 182-1 through 182-6, delays 184-1 and 184-2, delays 186-1 and 186-2, summation nodes 188-1 through 188-4, and decimators 190 and 192 connected as shown. In order to generate a first component of the PIM estimate signal for the paired receive channel near $3f_2-2f_1$, the partial regressor output signals output by the partial regressor components 164-1 through 164-5 of the DB-DPD subsystem 156 are first weighted and summed by the weighting functions 174-1 through 174-5 and the summation node 176-1, and the partial regressor output signals of the regressor components 164-6 through 164-10 are weighted and summed by the weighting functions 174-11 through 174-15 and the summation node 176-3. The outputs of the summation nodes 176-1 and 176-3 are summed together with offsets $b_{0A}$ and $b_{1A}$, respectively, at the summation nodes 178-1 and 178-3. The multiplier 180-1 then multiplies the output of the partial regressor component 182-3 and the output of the summation node 178-1. Likewise, the multiplier 180-3 multiplies a delayed version of the output of the partial regressor component 182-3 provided by the delay 186-1 and the output of the summation node 178-3. The outputs of the summation nodes 180-1 and 180-3 are summed by the summation nodes 188-1 and 188-3, and the resulting signal is decimated to a sampling rate of the receiver 138 by the decimator 190 to thereby provide the first component of the PIM estimate signal for the paired receive channel near $3f_2-2f_1$ ($y_{PIM,3f2-2f1}$).

In order to generate a second component of the PIM estimate signal for the paired receive channel near $2f_2-f_1$, the regressor output signals output by the partial regressor components 164-1 through 164-5 of the DB-DPD subsystem 156 are first weighted and summed by the weighting functions 174-6 through 174-10 and the summation node 176-2, and the partial regressor output signals of the partial regressor components 164-6 through 164-10 are weighted and summed by the weighting functions 174-16 through 174-20 and the summation node 176-4. The outputs of the summation nodes 176-2 and 176-4 are summed together with offsets $b_{0B}$ and $b_{1B}$, respectively, at the summation nodes 178-2 and 178-4. The multiplier 180-2 then multiplies the output of the partial regressor component 182-4 and the output of the summation node 178-2. Likewise, the multiplier 180-4 multiplies a delayed version of the output of the partial regressor component 182-4 provided by the delay 184-1 and the output of the summation node 178-4. The outputs of the summation nodes 180-2 and 180-4 are summed by the summation nodes 188-2 and 188-4, and the resulting signal is decimated to a sampling rate of the receiver 138 by the decimator 192 to thereby provide the second component of the PIM estimate signal for the paired receive channel near $2f_2-f_1$ ($y_{PIM,2f2-f1}$). In this embodiment, the first and second components of the PIM estimate signal are summed by a summation node 194 to provide the PIM estimate signal.

The memory polynomial models implemented by the DB-DPD subsystem 156 and the PIM estimate signal generation subsystem 158 are trained using any suitable training technique. More specifically, the regressors are known for the desired memory depth and order. A suitable training algorithm is used to train weighting factors $a_{01}$ through $a_{20}$ and $b_{01}$ through $b_{20}$ as well as the offsets $a_{0A}$, $a_{0B}$, $a_{1A}$, $a_{1B}$, $b_{0A}$, $b_{0B}$, $b_{1A}$, and $b_{1B}$ such that IMD in the radio frequency transmit signal and the PIM distortion in the main receiver output signal are minimized. In one preferred embodiment, resources (i.e., hardware and/or software resources) utilized to train the memory models are shared. For example, in some embodiments, the same resources may be used to train the two memory models by switching the inputs of a training algorithm implemented by the resources.

Figure 13:
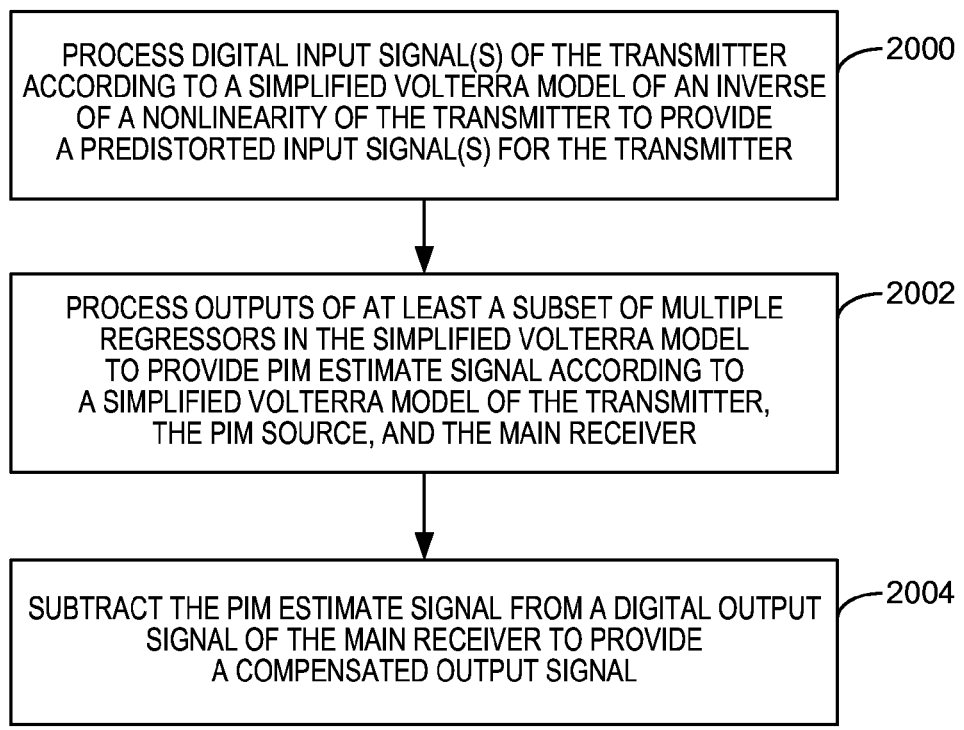
FIG. 13 is a flow chart that illustrates a process for providing PIM compensation according to one embodiment of the present disclosure.

FIG. 13 illustrates a process for providing PIM compensation according to one embodiment of the present disclosure. First, one or more digital input signals of a transmitter are processed according to a simplified Volterra model of an inverse of a nonlinearity of the transmitter to provide predistorted input signal(s) for the transmitter (step 2000). Outputs of at least a subset of the regressors, or partial regressors, in the simplified Volterra model are processed to provide a PIM estimate signal according to a simplified Volterra model of the transmitter, a PIM source, and a companion receiver of the transmitter (step 2002). The PIM estimate signal is subtracted from a digital output signal of the receiver to provide a compensated output signal (step 2004).

The following acronyms are used throughout this disclosure.

BB Baseband
DB-DPD Dual-Band Digital Predistorter
D/A Digital-to-Analog
DPD Digital Predistorter or Digital Predistortion
IMD Intermodulation Distortion
IMP Intermodulation Product
LMS Least Mean Squares
LNA Low Noise Amplifier LTE Long Term Evolution
MHz Megahertz
PA Power Amplifier
PIM Passive Intermodulation
RF Radio Frequency
RX Receive
SMA Subminiature Version A
TX Transmit
WB-DPD Wideband Digital Predistorter Those skilled in the art will recognize improvements and modifications to the preferred embodiments of the present disclosure. All such improvements and modifications are considered within the scope of the concepts disclosed herein and the claims that follow.

What is claimed is:

1. A communication device comprising:
a transmitter configured to receive a digital input signal and output a radio frequency transmit signal that is transmitted by the communication device;
a main receiver configured to receive a radio frequency receive signal and output a digital output signal, the digital output signal comprising passive intermodulation distortion that is a non-linear function of the radio frequency transmit signal output by the transmitter;
a combined digital predistortion and passive intermodulation estimate generation subsystem configured to:
receive the digital input signal of the transmitter;
predistort the digital input signal of the transmitter according to a behavioral model of an inverse of a nonlinearity of the transmitter; and
generate a digital passive intermodulation estimate signal that is an estimate of the passive intermodulation distortion in the digital output signal of the main receiver based on the digital input signal of the transmitter according to a behavioral model of the transmitter, a source of the passive intermodulation distortion, and the main receiver; and
subtraction circuitry configured to subtract the digital passive intermodulation estimate signal from the digital output signal of the main receiver to thereby provide a compensated digital output signal.

2. The communication device of claim 1 wherein the behavioral model of the transmitter, the source of the passive intermodulation distortion, and the main receiver is a simplified Volterra model.

3. The communication device of claim 1 wherein the behavioral model of the transmitter, the source of the passive intermodulation distortion, and the main receiver is a generalized memory polynomial model.

4. The communication device of claim 1 wherein the combined digital predistortion and passive intermodulation estimate generation subsystem comprises one or more components that are utilized for both predistortion of the digital input signal and generation of the digital passive intermodulation estimate signal.

5. The communication device of claim 4 wherein the behavioral model of the inverse of the nonlinearity of the transmitter and the behavioral model of the transmitter, the source of the passive intermodulation distortion, and the main receiver are simplified Volterra models, and the one or more components are one or more shared regressors of the simplified Volterra models.

6. The communication device of claim 5 wherein the simplified Volterra models are generalized memory polynomial models.

7. The communication device of claim 4 wherein the behavioral model of the inverse of the nonlinearity of the transmitter and the behavioral model of the transmitter, the source of the passive intermodulation distortion, and the main receiver are trained using the same resources.

8. The communication device of claim 1 wherein the radio frequency transmit signal is a concurrent multi-band signal, and the digital input signal of the transmitter is a digital representation of the concurrent multi-band signal.

9. The communication device of claim 1 wherein the transmitter and the main receiver are coupled to an antenna of the communication device via a duplexer.

10. The communication device of claim 1 wherein the communication device is a base station in a cellular communications network.

11. A communication device comprising:
a transmitter configured to receive a plurality of digital input signals and process the plurality of digital input signals to provide a radio frequency transmit signal as a concurrent multi-band signal, where each digital input signal of the plurality of digital input signals corresponds to a different frequency band of a plurality of frequency bands of the concurrent multi-band signal and output the radio frequency transmit signal that is transmitted by the communication device;
a main receiver configured to receive a radio frequency receive signal and output a digital output signal, the digital output signal comprising passive intermodulation distortion that is a non-linear function of the radio frequency transmit signal output by the transmitter;
a combined digital predistortion and passive intermodulation estimate generation subsystem configured to:
receive the plurality of digital input signals of the transmitter;
predistort the plurality of digital input signals of the transmitter according to a behavioral model of an inverse of a nonlinearity of the transmitter; and
generate a digital passive intermodulation estimate signal that is an estimate of the passive intermodulation distortion in the digital output signal of the main receiver according to a behavioral model of the transmitter, a source of the passive intermodulation distortion, and the main receiver; and
subtraction circuitry configured to subtract the digital passive intermodulation estimate signal from the digital output signal of the main receiver to thereby provide a compensated digital output signal.

12. The communication device of claim 11 wherein the combined digital predistortion and passive intermodulation estimate generation subsystem comprises one or more shared components that are utilized for both predistortion of the plurality of digital input signals and generation of the digital passive intermodulation estimate signal.

13. The communication device of claim 12 wherein the behavioral model of the inverse of the nonlinearity of the transmitter and the behavioral model of the transmitter, the source of the passive intermodulation distortion, and the main receiver are simplified Volterra models, and the one or more shared components are one or more shared regressors of the simplified Volterra models.

14. The communication device of claim 13 wherein the simplified Volterra models are generalized memory polynomial models.

15. The communication device of claim 11 wherein the behavioral model of the inverse of the nonlinearity of the transmitter and the behavioral model of the transmitter, the source of the passive intermodulation distortion, and the main receiver are trained using the same resources.

16. A method of operation of a communication device comprising a transmitter configured to receive a digital input signal and output a radio frequency transmit signal that is transmitted by the communication device and a main receiver configured to receive a radio frequency receive signal and output a digital output signal, the digital output signal comprising passive intermodulation distortion that is a non-linear function of the radio frequency transmit signal output by the transmitter, the method comprising:

predistorting the digital input signal according to a behavioral model of an inverse of a nonlinearity of the transmitter;

generating a digital passive intermodulation estimate signal that is an estimate of the passive intermodulation distortion in the digital output signal of the main receiver based on the digital input signal of the transmitter according to a behavioral model of the transmitter, a source of the passive intermodulation distortion, and the main receiver; and subtracting the digital passive intermodulation estimate signal from the digital output signal of the main receiver to thereby provide a compensated digital output signal;

wherein generating the digital passive intermodulation estimate signal and predistorting the digital input signal utilize one or more shared components of the behavioral model of the inverse of the nonlinearity of the transmitter and the behavioral model of the transmitter, the source of the passive intermodulation distortion, and the main receiver.

17. The method of claim 16 wherein the behavioral model of the inverse of the nonlinearity of the transmitter and the behavioral model of the transmitter, the source of the passive intermodulation distortion, and the main receiver are simplified Volterra models, and the one or more shared components are one or more shared regressors of the simplified Volterra models.

18. The method of claim 17 further comprising training the behavioral model of the inverse of the nonlinearity of the transmitter and the behavioral model of the transmitter, the source of the passive intermodulation distortion, and the main receiver using the same resources.

* * * * *

UNITED STATES PATENT AND TRADEMARK OFFICE
CERTIFICATE OF CORRECTION

| | |
|---|---|
| PATENT NO. | : 8,855,175 B2 |
| APPLICATION NO. | : 13/732610 |
| DATED | : October 7, 2014 |
| INVENTOR(S) | : Wyville et al. |

It is certified that error appears in the above-identified patent and that said Letters Patent is hereby corrected as shown below:

Specification

In Column 3, Lines 17-18, delete "drawing figures." and insert -- drawings/figures. --, therefor.

In Column 3, Lines 20-21, delete "DRAWING FIGURES" and insert -- DRAWINGS/FIGURES --, therefor.

In Column 3, Line 24, delete "drawing figures" and insert -- drawings/figures --, therefor.

In Column 4, Line 23, delete "drawing figures," and insert -- drawings/figures, --, therefor.

Claims

In Column 20, Line 49, in Claim 12, delete "more shared" and insert -- more --, therefor.

Signed and Sealed this
Sixteenth Day of August, 2016

Michelle K. Lee
*Director of the United States Patent and Trademark Office*